(12) United States Patent
Zlochin

(10) Patent No.: US 11,092,478 B2
(45) Date of Patent: Aug. 17, 2021

(54) RETRO-REFLECTIVE INTERFEROMETER

(71) Applicant: X-BEAMER TECHNOLOGIES LTD., Elad (IL)

(72) Inventor: Igal Zlochin, Haifa (IL)

(73) Assignee: X-BEAMER TECHNOLOGIES LTD., Elad (IL)

( * ) Notice: Subject to any disclaimer, the term of this patent is extended or adjusted under 35 U.S.C. 154(b) by 0 days.

(21) Appl. No.: 16/635,220

(22) PCT Filed: Jul. 26, 2018

(86) PCT No.: PCT/IL2018/050834
§ 371 (c)(1),
(2) Date: Jan. 30, 2020

(87) PCT Pub. No.: WO2019/026064
PCT Pub. Date: Feb. 7, 2019

(65) Prior Publication Data
US 2020/0340796 A1    Oct. 29, 2020

(30) Foreign Application Priority Data
Aug. 2, 2017  (IL) .......................................... 253799

(51) Int. Cl.
*G01H 9/00* (2006.01)
*G01B 9/02* (2006.01)
*G01V 1/22* (2006.01)

(52) U.S. Cl.
CPC .......... *G01H 9/00* (2013.01); *G01B 9/02007* (2013.01); *G01B 9/0209* (2013.01);
(Continued)

(58) Field of Classification Search
CPC ............ G01B 9/02007; G01B 9/02015; G01B 9/02052; G01B 9/0209; G01B 2290/30; G01H 9/00; G01V 1/226
See application file for complete search history.

(56) References Cited

U.S. PATENT DOCUMENTS

| 3,634,638 A | 1/1972 | Even-Tov et al. |
| 3,712,706 A | 1/1973 | Stamm |

(Continued)

FOREIGN PATENT DOCUMENTS

| CN | 101339012 | 1/2009 |
| CN | 106125131 | 11/2016 |

(Continued)

OTHER PUBLICATIONS

Tiziani, H.J. "A Study of the Use of Laser Speckle to Measure Small Tilts of Optically Rough Surfaces Accurately" Optic Communications vol. 5 No. 4, pp. 271-272 (1972).

(Continued)

*Primary Examiner* — Michael A Lyons
(74) *Attorney, Agent, or Firm* — The Roy Gross Law Firm, LLC; Roy Gross

(57) ABSTRACT

There is provided retro-reflective interferometer device for detection and/or measurement of displacements and/or rotations and/or mechanical vibrations, the device includes a transceiver unit including at least one radiation source capable of emitting a radiation beam and at least one radiation receiver; a movable unit movably mounted with respect to said transceiver unit, the movable unit includes one or more movable elements that are susceptible to displacement and/or vibration by an external force; and at least one retro-reflective element capable of reflecting back the radiation beam to form a sequence of radiation patterns; and an analyzing element operationally associated with the radiation receiver for analyzing a displacement change, an intensity change and/or a frequency change in the sequence of radiation patterns. Further provided are systems including the device and methods utilizing the same.

19 Claims, 5 Drawing Sheets

(52) U.S. Cl.
CPC ..... *G01B 9/02015* (2013.01); *G01B 9/02052* (2013.01); *G01V 1/226* (2013.01); *G01B 2290/30* (2013.01)

(56) References Cited

U.S. PATENT DOCUMENTS

| | | | |
|---|---|---|---|
| 3,726,595 A | 4/1973 | Matsumoto | |
| 3,912,893 A | 10/1975 | Stoler | |
| 3,952,583 A | 4/1976 | Rosati | |
| 4,212,218 A | 7/1980 | Braner et al. | |
| 4,361,911 A | 11/1982 | Buser et al. | |
| 4,368,982 A * | 1/1983 | Van Arnam | G01N 21/55 250/224 |
| 4,446,543 A * | 5/1984 | McLandrich | H04R 23/008 367/141 |
| 4,517,569 A | 5/1985 | Gevharz | |
| 4,581,528 A | 4/1986 | Brogårdh et al. | |
| 4,649,271 A | 3/1987 | Hök et al. | |
| 4,731,879 A | 3/1988 | Sepp et al. | |
| 4,829,287 A | 5/1989 | Kerr et al. | |
| 4,879,544 A | 11/1989 | Maki et al. | |
| 5,127,734 A * | 7/1992 | Ohi | G01B 9/02052 356/514 |
| 5,128,537 A | 7/1992 | Hälg | |
| 5,146,776 A | 9/1992 | Twerdochlib et al. | |
| 5,171,624 A | 12/1992 | Walter | |
| 5,249,163 A | 9/1993 | Erickson | |
| 5,274,379 A | 12/1993 | Carbonneau et al. | |
| 5,333,048 A * | 7/1994 | Michel | G01D 5/344 250/237 G |
| 5,394,233 A * | 2/1995 | Wang | G01H 9/00 356/28.5 |
| 5,515,730 A * | 5/1996 | Manzouri | G01H 9/00 356/619 |
| 5,837,998 A | 11/1998 | Dinev et al. | |
| 5,909,280 A | 6/1999 | Zavracky | |
| 6,055,080 A | 4/2000 | Fürstenau et al. | |
| 6,064,630 A | 5/2000 | Fersht et al. | |
| 6,626,544 B2 | 9/2003 | Lu et al. | |
| 6,737,972 B1 | 5/2004 | Gitlis | |
| 6,823,963 B2 | 11/2004 | Albertini et al. | |
| 6,882,447 B1 | 4/2005 | Nakajima et al. | |
| 6,882,477 B1 | 4/2005 | Schattenburg et al. | |
| 6,937,972 B1 | 8/2005 | Van Ee | |
| 7,134,343 B2 | 11/2006 | Suzuki et al. | |
| 7,202,797 B2 | 4/2007 | Zhavi | |
| 8,638,991 B2 | 1/2014 | Zalevsky et al. | |
| 8,711,367 B2 | 4/2014 | Meissner | |
| 8,797,828 B1 | 8/2014 | Lev et al. | |
| 8,948,603 B2 | 2/2015 | Iwamoto et al. | |
| 9,110,181 B2 | 8/2015 | Cowsik | |
| 9,250,118 B2 | 2/2016 | Zumberge et al. | |
| 9,256,000 B2 | 2/2016 | Barone et al. | |
| 9,300,409 B1 | 3/2016 | Leugoud et al. | |
| 2003/0160969 A1 | 8/2003 | Endo et al. | |
| 2008/0007715 A1 | 1/2008 | Meldahl et al. | |
| 2008/0259344 A1* | 10/2008 | Osborn | G01B 9/02052 356/450 |
| 2009/0299197 A1 | 12/2009 | Antonelli et al. | |
| 2012/0247213 A1* | 10/2012 | Zumberge | G01H 9/00 73/653 |
| 2013/0163004 A1 | 6/2013 | Matsumoto | |
| 2015/0338208 A1* | 11/2015 | DeWeert | G01V 1/226 356/520 |
| 2019/0049312 A1* | 2/2019 | Strandjord | G01B 11/14 |

FOREIGN PATENT DOCUMENTS

| | | |
|---|---|---|
| WO | 8702470 | 4/1987 |
| WO | 0192846 | 12/2001 |

OTHER PUBLICATIONS

International Search Report for International Application No. PCT/IL2018/050834, dated Nov. 14, 2018.
Written Opinion of the International Searching Authority for International Application No. PCT/IL2018/050834 dated Nov. 14, 2018.

* cited by examiner

RETRO-REFLECTIVE INTERFEROMETER

CROSS REFERENCE TO RELATED APPLICATIONS

This application is a National Phase of PCT Patent Application No. PCT/IL2018/050834 having International filing date of Jul. 26, 2018, which claims the benefit of priority to Israeli Patent Application No. 253799 filed on Aug. 2, 2017. The contents of the above applications are all incorporated by reference as if fully set forth herein in their entirety.

FIELD OF THE INVENTION

The present invention generally relates to systems, devices and methods utilizing interferometric retro-reflection displacement vibration meter. In particular, the present invention relates to a laser interferometer systems and devices for measuring small angle displacements and uses thereof.

BACKGROUND OF THE INVENTION

Various techniques and methods are used for displacement and vibration measurements in a wide range of applications.

Optical interferometry, for example, is used in distance metrology. Typically, an optical interferometer having a sensitive optical path including the entire distance to be measured is employed. Variations of this distance on the order of half an optical wavelength will cause the interferometer output to change from constructive interference to destructive interference, or vice versa. Such an interferometer fringe can easily be detected. With advanced measurement techniques, a small fraction of an interferometer fringe can be detected, thereby providing measurement precision on the order of a small fraction of the optical wavelength.

Optical position-measuring devices, having gratings as measuring standards which supply the necessary resolutions in the nanometer range, are usually based on interferential scanning principles. In such settings, a light beam from a suitable light source is split into at least two coherent partial beams of rays which subsequently act upon a plurality of gratings in the respective partial-beam paths before they are reunited and brought to interference. The position information ultimately of interest is provided by the displacement-dependent phase position of the two interfering partial beams of rays. The resulting path-length difference is usually approximately zero for the two partial beams of rays between splitting and reuniting in symmetrical partial-beam path variants of such systems. Therefore, a small coherence length of the light used is sufficient to ensure the desired interference on the detection side. In a configuration, known as achromatic interference lithography (AIL), the beam is split and recombined using diffraction gratings. In this case, beams lacking high spatial and temporal coherence can still be used to make useful gratings. The AIL method avoids the need for a highly coherent source. For example, U.S. Pat. No. 8,711,367 is directed to a position-measuring device. U.S. Pat. No. 8,948,603 is directed to an optical microphone. U.S. Pat. No. 6,882,447 is directed to method and system of interference lithography (IL), which utilizes phase-locked, scanning beams. For example, U.S. Pat. No. 5,333,048 is directed to a polarizing interferometric displacement measuring arrangement. U.S. Pat. No. 3,726,595 is directed to a method for optical detection and/or measurement of movement of a diffraction grating. U.S. Patent Application No. 2013/0163004 is directed to position detection apparatus, imprint apparatus, and method for manufacturing device. U.S. Patent Application No. 2012/0247213 is directed optical seismometers. U.S. patent application No. 2003/0160969 is directed to an interference measuring device, Some techniques and methods for displacement and vibration measurements utilize Laser Speckles. When a rough surface is illuminated by a laser beam, a granular effect is observed and this grainy pattern is known as speckle. In expanded beam illumination, object in-plane displacements (movements parallel to the surface under observation) may cause speckle pattern translations when the optical system is focused on the object surface, whereas out-of-plane rotations (tilts around in-plane axis) will not significantly affect the image. If the speckle pattern is recorded at the Fourier plane of the object surface, in-plane displacements will not appreciably change the speckles, although out-of-plane rotations will displace them. A defocused two-exposure method to measure out-of-plane rotations was disclosed by Tiziani, (Opt. Communications 5, 271-274 (1972) and was later extended for vibration analysis (Speckle Metrology, R. K. Erf, ed. (Academic, New York, 1978), pp. 73-110). For example, U.S. Pat. No. 8,638,991 discloses a motion detection system and method, presenting a method for imaging an object. The method comprises imaging a coherent speckle pattern propagating from an object, using an imaging system being focused on a plane displaced from the object. For example, U.S. Pat. No. 3,952,583 is directed to an apparatus and method for the remote detection of vibrations of diffuse surfaces.

Conventional vibration measurements utilize instruments which determine the motion of a vibrating body by placing a seismic mass, which is mounted on springs, on the body and by measuring the relative displacements of the body and the mass. The measurement is usually made by resistance or capacitance probes. A device which contains these components is called an accelerometer. The accuracy of the measurements of the motions is dependent upon the sensitivity of the measurement technique. A vibration responsive detector with two seismic elements is disclosed, for example, is U.S. Pat. No. 4,212,208. A vibration sensor is disclosed, for example, from U.S. Pat. No. 6,937,972.

When constructing such detectors, great attention must be addressed to cleanliness, dimensional accuracy and quality control, because small quantities of foreign matter can drastically reduce the reliability of the detector apparatus. Thus, where cylindrical or spherical seismic elements are mounted on wire supports, there are only point contacts or, at most, line contacts between the electrically conductive members. This means that a small amount of non-conducting foreign material can render the operation of the detecting apparatus unacceptably inaccurate in that the open circuit condition will be indicated far too frequently as a result of the contacting surfaces being separated by insulating foreign matter. Conventional spatially averaging accelerometer sensors typically use piezo electric transducers (PZTs). However, spatially averaging accelerometer sensors experience many problems from the use of PZTs. For example, PZTs used in spatially averaging accelerometer sensors typically have high pressure sensitivity. This high pressure sensitivity causes problems in accurately detecting acceleration. Therefore, in order for the PZTs to accurately detect acceleration, the pressure sensitivity of the PZTs is reduced by enclosing the PZTs in undesirable, heavy metal cases. Moreover, PZTs cannot be easily conformed to the particular shape required for specific applications, especially when acceleration must be integrated over a large area. In this case, many smaller PZTs must be connected together to form an array of sensors. However, an array of sensors is too heavy, and very expensive. Further, an array of sensors is subject to electromagnetic interference since the output signal produced by the array is an electrical signal. Also, an array of sensors is limited to a relatively small size since a large array would be too fragile. Moreover, an array of sensors has an acceleration sensitivity which is undesirably limited at low frequencies.

Many conventional accelerometers (including angular accelerometers) sense displacement of a pendulum or a spring, caused by acceleration, by using an optical displacement sensor, thereby obtaining the acceleration. High optical precision is required of these optics systems because the light beam shifts atop the photodetector's surface in correspondence with the physical displacement of the diaphragm caused by vibration. Therefore, complicated optics of this sort of devices leads to reduced manufactured yield and the entire cost of the system is increased. For example, U.S. Pat. No. 5,249,163 is directed to optical lever for acoustic and ultrasound sensor. For example, U.S. Pat. No. 5,837,998 is directed to a Two-dimensional fiber optic acceleration and vibration sensor. For example, U.S. Pat. No. 7,134,343 is directed to opto-acoustoelectric device and methods for analyzing mechanical vibration and sound.

Optical detection techniques, such as those described by Scruby and Drain (Laser Ultrasonics, Techniques and Applications, Adam Hilger, New York (1990), pages 325-350), can be used instead of piezoelectric transducers to detect a surface's displacement. Generally, a laser beam illuminates the surface so that when it vibrates, a phase shift is imparted to the reflected beam. The reflected beam is interfered with a reference beam that originates from the same laser source as the reflected beam. The amplitude and frequency of the intensity fluctuations of the interfering beams correspond to the surface's motion and can be detected with a photodetector. In general, the known optical transducers do not readily lend themselves to low-cost mass production, and therefore are relatively expensive to produce.

Non-contact optical vibration measuring systems are known which use a technique which may be described as projection Moiré interferometry. In this technique an image of a first grating is projected on to an object of interest and the reflection of the grating passed through a second grating to produce Moiré fringes. U.S. Pat. No. 5,515,730 is directed to apparatus for detecting the amplitude, frequency or modes of vibration of a vibrating panel Displacement and vibration measurements are further used for seismic measurements. Wave movements resulting from dilation of the crust of the Earth, which occurs prior to an earthquake, may be detected. When such wave movements are detected, earthquake detection and prediction systems may determine the velocity, amplitude and/or direction of the waves and their movement, and based thereon may further determine the magnitude and location of the earthquake and/or the likelihood of a future earthquake. Seismometers can pick up energy transmissions (vibrations) in the earth and the seismic signals detected can be analyzed to provide understanding of the surrounding earth composition. A common seismometer design uses an inertial mass suspended on a spring or pendulum where the suspended inertial mass moves in response to vibrations. In general, two classes of seismometers are known as short-period and broadband seismometers. For example, U.S. Pat. No. 9,256,000 is directed to a low frequency folded pendulum and vertical seismic sensor utilizing such a folded pendulum. For example, U.S. Pat. No. 9,250,118 is directed to a leaf-spring optical seismometer using fringe signals for seismic measurements. U.S. Pat. No. 9,300,409 is directed to a rotational electrochemical seismometer using magneto-hydrodynamic technology and related methods. U.S. Pat. No. 9,110,181 is directed to a rotational seismometer for near-field measurements. U.S. Pat. No. 6,823,963 is directed to a seismic wave measuring device.

Displacement and vibration measurements may further be used in some intrusion detection systems, such as, Perimeter Security System, linear installation systems (such as, piping systems, railway tracks, fences, etc.). Intrusion detection systems are widely employed to secure a large variety of sites, from low-security private residences (homes, businesses and other premises) to high-security military installations. Most of the systems available include a physical barrier and a detection capability. The most widely used conventional systems utilize technologies such as, CCTV cameras, Taut-wire fences, Leaky wave coax cables, E-field sensors, Microphonic cables, Strain gauged systems, X-band line-of-sight radar beams, and Free-space infrared surveillance equipment. These generally suffer from a combination of high cost, false alarms and high operating and maintenance requirements. Other detection systems are used which employ vibration sensors (motion sensors) in the form of piezoelectric elements attached to a chain link fence. Such vibration sensing systems suffer from a number of disadvantages, such as the extreme difficulty of properly aligning the vibration sensor when mounting on a fence and lacking the ability to set the direction of sensitivity for the sensor, which may be required for objects tending to naturally move along one direction, such as fences. Another type of system uses fiber optic cables, which are attached to a fence. When the cable is cut or otherwise broken, an alarm is activated. For example, U.S. Pat. No. 7,202,797 is directed to detecting, locating and identifying incidents of approaching a linear installation.

Vibration measurements may also be used for monitoring and control of electrical equipment, such as generators and turbines. For example, U.S. Pat. Nos. 4,581,528 and 4,649,271, which describes a vibration sensor in which a reflecting built-in beam subject to the vibrations to be measured receives incident light from an optical fiber and reflects this light into the same optical fiber. Fiber Optic Vibration Monitors (FOVM) have been used to measure vibration at various sites on the stator end windings of electrical generators in power generation plants. For example, U.S. Pat. No. 5,146,776 is directed to a method for continuously calibrating a Laser vibrometer.

There is thus a need in the art for systems, devices and methods that are efficient, accurate, cost effective and for accurately determining and measuring remote displacement events.

SUMMARY OF THE INVENTION

According to some embodiments, there are provided optoelectronic systems, devices and methods for accurately and efficiently detecting and measuring vibrations and/or displacements at remote locations.

According to some embodiments, there are provided interferometric retro-reflection displacement/vibration meter, systems and devices, as well as suitable measurement methods utilizing the same. In some embodiments, the systems, devices and methods disclosed herein utilize a radiation beam interferometer for detecting and/or measuring remote small angle displacements for use in various settings.

According to some embodiments, there is provided a retro-reflective laser interferometer for high resolution three-axis measurements of angular displacement and vibration of a body.

According to some embodiments, the disclosed optoelectronic systems, devices and method are at least partially based on radiation beam (such as a laser beam) deflection, diffraction and interference for detecting angular displacements and vibrations for utilization in various applications.

In some embodiments, the systems, devices and methods disclosed herein are highly advantageous as they allow a very efficient, accurate and cost effective means for accurately determining and measuring vibration and displacement events. In some embodiments, the vibrations or displacement events may be in the range of less than 1 nm. In some embodiments, the disclosed systems and devices advantageously provide multi-dimensional sensitivity, increased detection coverage, ease of the device installation and alignment, as well as reduction in the required installation, operational and maintenance costs. In further embodiments, the advantageous combination of low coherence laser diode, diffraction grating for laser beam splitting and retro-reflective sheeting for recombination of the split beams provide a highly stable, inexpensive interferometer that needs minimal alignment In some embodiments, the advantageous systems, devices and methods can be used in various settings, including, for example, but not limited to: seismographic measurements (for example, warning of earthquakes in land and sea), tunneling detection, locating and detecting linear installations problems (for example, underground water or gas pumps), remote monitoring of vibrations in electrical machinery (for example, alternators, transformers, motors, generators, and the like), various security systems (such as, perimeter and offshore security systems), and the like.

In some embodiments, the advantageous systems, devices and methods can be used for various measurements related to movement of a living subject body, such as, for example, but not limited to: heart rate, blood pressure, breathing, respiratory rate, body movement, sleep monitoring, and the like. In some embodiments, the systems, devices and methods may be used in home-care settings and/or in health care settings (such as, hospitals, clinics, and the like). In some embodiments, the systems, devices and methods may be in direct contact with the subject body (for example, in the form of a wearable device), or in an indirect contact (for example, associated with a platform (such as, for example, a bed)) that is in contact with subject.

In some exemplary embodiments, the systems, devices and methods can be used for monitoring breathing or respiration rate by detecting movement of a subject body. In some embodiments, the subject is an infant and the systems, devices and methods may be used to monitor the infant movement and/or breathing (for example, during sleep) and further provide an alert when no movement or breathing is detected over a predetermined period of time.

According to some embodiments, there is provided a retro-reflective interferometer device for detection and/or measurement of displacement or/and mechanical vibrations (optionally at a remote location), the device includes:
 a transceiver unit comprising:
  a) at least one radiation source capable of emitting a radiation beam;
  b) a beam-splitting element, capable of splitting said radiation beam to at least two coherent partial beams;
  c) at least one radiation receiver located in a plane optically coupled with a diffraction grating plane;
 a movable unit movably mounted with respect to said transceiver unit, said movable unit comprising:
  a) one or more movable elements that are susceptible to displacement and/or vibration by an external force;
  b) at least one retro-reflective element attached to at least one of said movable elements, wherein said retro-reflective element is capable of reflecting back the at least two coherent partial beams generated by the beam-splitting element, to form a plurality or sequence of interference patterns in a far field, wherein said interference patterns are modified by the displacement or/and mechanical vibration of said movable element; and
 an analyzing element operationally associated with said radiation receiver for analyzing at least one of: a displacement change, an intensity change and/or a frequency change in said sequence of interference patterns.

According to some embodiments, at least one radiation receiver is configured to detect said sequences of the interference patterns generated by said at least one retro-reflective element, to convert the detected radiation into an electric signal; said radiation receiver is capable of generating an output signal in response to said interference pattern changes resulting from said displacement or/and mechanical vibration of said movable element, the output signal comprises information regarding amplitude and/or frequency of said displacement or/and mechanical vibration.

According to some embodiments, the retro-reflective element is in the form of retro-reflective sheeting. In some embodiments, the retro-reflective sheeting may include an array of corner-cube micro-prisms, an array of cat-eye micro-reflectors, a fiber-optic back reflection bundle, MEMS mirrors, or any combination thereof.

According to some embodiments, the beam-splitting element may be selected from a diffraction grating, cube beam-splitter, mirror beam-splitter, wedged beam-splitter, Wollaston polarizer, and the like, or any combination thereof. Each possibility is a separate embodiment. In some exemplary embodiments, the beam-splitter element is a diffraction grating.

According to some embodiments, the retro-reflective element may include a retro-reflective diffractive microstructure that is capable of reflecting back said radiation beam and to form a diffraction pattern in the far field, said diffraction patterns are modified by the mechanical rotation, vibration or/and displacement driven by the external force.

According to some embodiments, the transceiver unit is stationary.

According to some embodiments, the transceiver unit, the movable unit and/or the analyzing element may be situated (located) in a single or discrete housings, said discrete housings are functionally and/or physically associated. Each possibility is a separate embodiment.

In some embodiments, the transceiver unit may be located at any distance, for example, at a distance of 0.5 m-100 km (and any subranges thereof) with respect to the movable unit. In some embodiments, the distance is a horizontal distance. In some embodiments, the distance is a vertical distance.

According to some embodiments, the housing(s) may include, or be in a shape selected from: a pipe, a Quadrilateral, or other tubular like shape.

According to some embodiments, the movable elements may include a pipe, a pendulum, a spring, a pendulum based spring cantilever, a membrane, a float, or any combination thereof.

In some embodiments, the radiation source may be selected from a low coherence radiation beam, high coherence radiation beam, a laser diode, a solid-state laser, a liquid laser, a gas laser, a light emitting diode (LED), a spectrometer and a monochromatic light source.

According to some embodiments, the at least one radiation receiver may be selected from: a CCD or CMOS image sensor, a video camera, a photodiode array, a position-sensitive light detector (PSD), a single photodiode and suitable imaging element.

According to some embodiments, the analyzing element may include an image processing unit, a computer, a CPU, a programmed electronic processor, and a microcontroller.

According to some embodiments, the device may further include an alert unit configured to issue an alert based on a signal from the analyzing element. In some embodiments, the alert may be issued when displacement, rotation and/or mechanical vibrations of a body is detected or measured to be above a predetermined threshold. In some embodiments, the alert may be issued when displacement, rotation and/or mechanical vibrations of a body is not detected or measured over predetermined period of time. In some embodiments, the alert may be any type of alert, including, for example, tactile alert, visual alert, audible alert, and the like, or combinations thereof.

According to some embodiments, the device may be used for detection of low frequency vibration (such as in the range of 0.01 Hz to 100 Hz) and displacement. According to some embodiments, when used for detection of low frequency vibration and displacement, the movable element may be in a form of a pipe, wherein said movable element is connected with or by a hose or a swivel joint to a stationary housing harboring the transceiver unit, said stationary housing is in a shape of a pipe, whereby low frequency vibrations or/and displacement of said movable element causes tilt change of said retro-reflective element relative to said radiation beam such that said tilt is being proportional to the vibration amplitude or/and displacement to be measured.

According to another embodiment, when used for detection of low frequency vibration and displacement, the vertical movable element may be in a form of a heavy mass that includes a retro-reflective element movably connected to a stationary housing, harboring the transceiver unit, said stationary housing is in a shape of a vertical pipe, whereby low frequency vibrations or/and vertical displacement of said heavy mass causes tilt change of said retro-reflective element relative to said radiation beam such that said tilt is being proportional to the vibration amplitude or/and vertical displacement to be measured.

According to some embodiments, when used for detection of high frequency vibration (such as in the range of 100 Hz to 100 kHz) the retro-reflective element may be in a form of a retro-reflective sheeting, and may extend transversely to said radiation beam, whereby each vibration of said cantilever or/and membrane causes the retro-reflective sheeting parts to change their tilts to modulate the radiation, said modulation being detected, and being related to the vibration or/and displacement to be measured.

According to some embodiments, the radiation source may be mounted on a cantilever, whereby each vibration of said cantilever causes said radiation beam to move transversely relative to said retro-reflective sheeting in such manner that tilt of said radiation beam relative to said retro-reflective sheeting is being proportional to the vibration or/and displacement to be measured.

According to some embodiments, the transparent diffraction grating includes a reflective non transparent structure that can reflect the diffraction and interference patterns to a second radiation receiver, which can detect high frequency vibrations.

According to some exemplary embodiments, the housing(s) may be made from elastic material that allows carrying out measurement of the value of the external force.

According to some embodiments, the optical conjugation of the at least one radiation receiver plane with the diffraction grating plane is carried out by an image system.

According to some embodiments, the device may be used for high resolution three-axis detection and/or measurement of various sources of displacement or/and mechanical vibrations.

According to some embodiments, when used for detection of earth movement, perimeter security and/or tunneling detection the device includes one or more of the following: the housing(s) are in the form of a pipe; the movable elements are in the form of a pipe a heavy mass, a pendulum based spring cantilever and/or a membrane; the at least one radiation source is a laser diode; the at least one radiation receiver is an image camera; and the at least one retro-reflective element is in the form of retro-reflective sheeting. Each possibility is a separate embodiment.

According to some embodiments, when used for detection movement of a subject body, the device includes one or more of the following: the housings are in the form of a pipe configured to be attached to a base of a platform; the movable elements are in the form of a pendulum based spring, cantilever or/and a membrane; the at least one radiation source is a laser diode; the at least one radiation receiver is an image sensor; and said at least one retro-reflective element is in the form of retro-reflective sheeting. In some embodiments, the platform is a bed or a crib. In some embodiments, the subject is an infant. In some embodiments, the alert unit is configured to issue an alert when no movement is detected over a predetermined period of time (such as 20 seconds-240 seconds).

According to some embodiments, there is provided a method for measurement of displacements and/or mechanical vibrations of a movable element caused by an external force, the method includes the steps of:
Irradiating at least one retro-reflective element by a radiation beam via a beam-splitting element;
splitting said radiation beam by said beam-splitting element to multiple diffraction orders and using for the measurement at least two coherent partial beams;
reflecting back said at least two coherent partial beams by the at least one retro-reflective element to a radiation receiver located at a plane optically conjugated with a beam-splitting plane and being in a far field of said movable element, wherein said partial beams form an interference patterns;
detecting a plurality or sequence of said retro-reflective interference patterns in the far field by said radiation receiver; said interference patterns are modified (displaced or changed their intensity distribution) by mechanical vibration or/and displacement of said movable element caused by the external force;
converting said sequence of the interference patterns into a digital signal indicative of the movement of said movable element in response to said external force; and
determining, by an analyzing unit, amplitudes and frequencies of the detected vibrations and/or displacement values by processing of said interference patterns sequence.

In some embodiments, the processing includes a mathematical processing.

According to some embodiments, the method may further include a step of issuing an alert based on a signal from the analyzing unit. For example, the alert may be issued when displacement, rotation and/or mechanical vibrations of a body is detected or measured to be above a predetermined threshold. For example, the alert may be issued when displacement, rotation and/or mechanical vibrations of a body is not detected or measured over predetermined period of time.

According to some embodiments, the radiation beam may be selected from a low coherence radiation beam, high coherence radiation beam, a laser diode, a solid-state laser, a liquid laser, a gas laser, LED, a spectrometer and a monochromatic light source and any combination thereof. Each possibility is a separate embodiment.

According to some embodiments, the retro-reflective element may include sheeting with an array of corner-cube micro-prisms or an array of cat-eye micro-reflectors.

According to some embodiments, the optical conjugation of the main radiation receiver plane with said diffraction grating plane is carried out by an image system.

According to some embodiments, the external force is applied on or along the retro-reflective sheeting to modify its shape; longitudinal displacement of a part of said retro-reflective sheeting causes its magnified transversal displacement (convexity or cavity) and respective tilts of particular parts of said retro-reflective sheeting; and the tilts of the particular parts of the reflective sheeting causes said interference pattern displacement or changing its intensity distribution in the plane of said radiation receiver.

According to some embodiments, there is provided a method for measurement of mechanical vibrations or/and displacements of a movable element caused by an external force, including the steps of:
   irradiating an array of diffractive retro-reflectors, associated with a movable element, with a radiation beam that is reflected back to a radiation detector; wherein the array forms a changeable diffraction beam pattern in a far field, which is modified by mechanical vibration or/and displacement of the movable element in response to the external force;
   detecting said changeable diffraction pattern by said radiation detector; and
   analyzing the changes by an analyzing unit, to determine amplitude and frequency of the movable element vibration or/and displacement.

According to some embodiments, the relation between intensities of back reflected and diffracted radiation from the retro-reflective array may be used for distance measurement between said movable element and radiation detector.

According to some embodiments, there is provided a system for detection and measurement of displacement or/and mechanical vibrations of a surface (optionally, at a remote location), the system includes:
   a transceiver unit comprising:
      a) at least two monochromatic radiation source capable of emitting radiation beams with different wavelengths;
      b) a beam splitting element, capable of splitting said radiation beams to at least two coherent partial beams of each wavelength;
      c) a radiation receiver located in a plane optically coupled with a diffraction grating plane;
   a movable unit at a remote location movably mounted with respect to said transceiver unit, said movable unit comprising:
      a) one or more movable elements that are susceptible to displacement and/or vibration by an external force applied on or at a surface;
      b) a retro-reflective element attached to at least one of said movable elements surface, wherein said retro-reflective element is capable of reflecting back the at least two coherent partial beams of each wavelength generated by the beam splitting element, to form a sequence of interference patterns in a far field, wherein said patterns are modified by the displacement or/and mechanical vibration of said movable element;
   an analyzing element operationally associated with said radiation receiver for analyzing at least one of: a displacement change, an intensity change and/or a frequency change in said sequence of interference patterns; and
   a transmitter unit configured to transmit data obtained from the analyzing element to a remote location.

According to some embodiments, the system may be used for high resolution three-axis detection and/or measurement of various sources of displacement or/and mechanical vibrations.

According to some embodiments, the system may be used for detection of earth movement, perimeter security and/or tunneling detection.

According to some embodiments, the system may be used for detection of movement of a subject body.

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other advantages or improvements. Other objects, features and advantages of the present invention will become clear from the following description and drawings.

BRIEF DESCRIPTION OF THE FIGURES

Some embodiments of the disclosure are described herein with reference to the accompanying figures. The description, together with the figures, makes apparent to a person having ordinary skill in the art how some embodiments of the disclosure may be practiced. The figures are for the purpose of illustrative discussion and no attempt is made to show structural details of an embodiment in more detail than is necessary for a fundamental understanding of the teachings of the disclosure. For the sake of clarity, some objects depicted in the figures are not to scale.

DETAILED DESCRIPTION OF THE INVENTION

Figure 1:
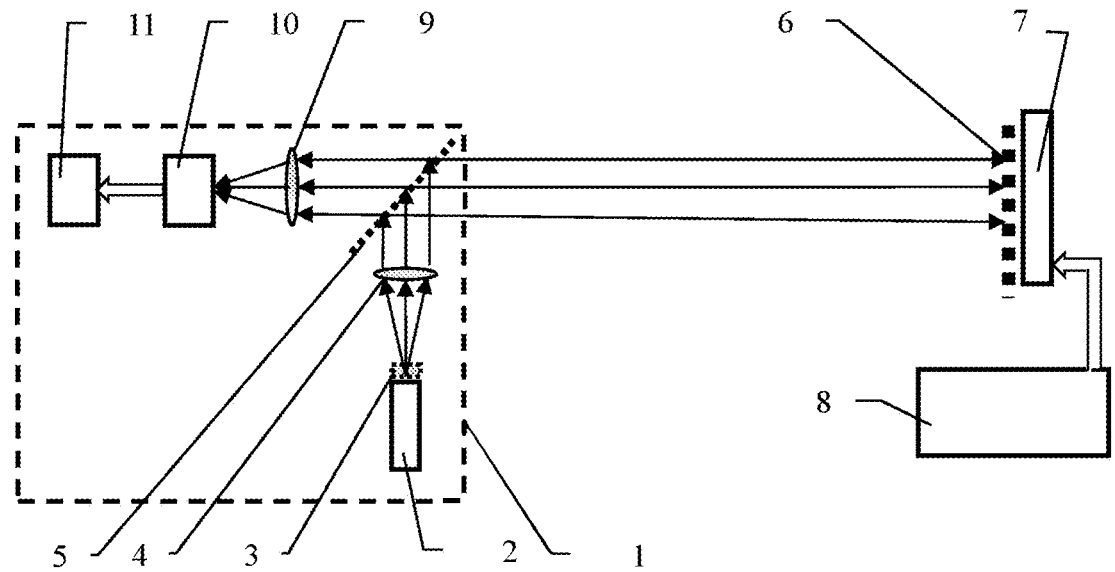
FIG. 1—a schematic illustration of a retro-reflective laser interferometer, according to some embodiments.

In the following description, various aspects of the disclosure will be described. For the purpose of explanation, specific configurations and details are set forth in order to provide a thorough understanding of the disclosure. However, it will also be apparent to one skilled in the art that the disclosure may be practiced without specific details being presented herein.

Furthermore, well-known features may be omitted or simplified in order not to obscure the disclosure.

According to some embodiments, there are provided optoelectronic systems, devices and methods for accurately and efficiently detecting and measuring vibrations and/or displacements at remote locations.

According to some embodiments, there are provided interferometric retro-reflection displacement/vibration meter systems and devices as well as suitable measurement methods utilizing the same. In some embodiments, the systems, devices and methods disclosed herein utilize a radiation beam interferometer for detecting and/or measuring remote small angle displacements for use in various settings.

According to some embodiments, the devices and systems disclosed herein (as embodied by a retro-reflective laser interferometer) can have many advantageous applications including, but not limited to any one of the following:

- Providing a warning of earthquakes in land and sea seismography
- Providing a warning in perimeter and offshore security systems. It can be mounted underground, underwater or on/along a security fence. The system can include a plurality of detection units positioned in an array along the length of a security perimeter, at a distance one from each other, wherein each detection unit includes at least one retro-reflective laser interferometer for sensing seismic or acoustic interference or noise/s (in accordance with the configuration of the system, namely either as buried system or as an above the ground one), and the issuance of a suiting indicating signal; a signal processor for analyzing the signal and comparing it to a cache (data bank) of seismic or acoustic interference or noise signatures that is embedded in the sensor unit; and a communications device for transferring data from the sensor unit to a distant command and control center
- Detecting, locating and identifying incidents of approaching a linear installation (for example, piping systems)
- Remote monitoring of the vibrations in parts of electrical machines, such as for example stators of large alternators, high-voltage transformers, power motors, and the like, for the purpose of both characterizing the machine and monitoring its operation, in order to intervene in good time in the event of abnormal amplitude of the vibrations.
- A field installed communications unit that is capable of communicating with a remote system where it may be too costly, too difficult, or undesirable to communicate using traditional forms of communication. For example, for the transmission of data, for which on the transmitter side only a limited reserve of energy is available which does not permit emission of high power signals. An example may be tracking the movements of military troops about a battlefield or airplane without pilot
- Establishing secure optical communications between soldiers or military units in the task of identifying friend-or-foe (IFF)
- Power monitoring systems of cargo containers and their contents
- Detection devices for measuring force and pressure
- Use as geophone, hydrophone and/or microphone.

In further embodiments, the systems, devices and methods disclosed herein can have advantageous applications related to measurement and detection of movement of a living organism body (or body parts of a subject), including, but not limited to: measurement, monitoring or diagnostic of: blood pressure, heart rate, respiration and breathing, sleep, body movement, and the like. In some embodiments, the systems, devices and methods may be used in home-care settings and/or in health care settings. In some embodiments, the systems, devices and methods may be in direct contact or in in-direct contact with the subject body. In some exemplary embodiments, the systems, devices and methods disclosed herein can be used for monitoring breathing or respiration rate by detecting movement of a subject body (or body parts thereof). In some embodiments, the subject is an infant and the systems, devices and methods may be used to monitor the infant movement and/or breathing (for example, during sleep) and further provide an alert when no movement or breathing is detected over a predetermined period of time. In some exemplary embodiments, the systems, devices and methods may thus be used for detection and prevention of Sudden Infant Death Syndrome (SIDS).

According to some embodiments, there is provided a three-dimensional optical seismometer for measuring three perpendicular components of an acceleration, velocity, displacement and frequency spectrum of a moving object to which the sensor is attached, utilizing retro-reflective sheeting, grating interferometer, an optical lever and a dual-axis position photo-sensor for use in earthquake and security warning systems.

In some embodiments, there is provided a device for detecting drive line system imbalances, for detecting and monitoring the vibration and displacement level of large scale objects, such as, for example, large machineries, bridges, buildings and etc.

According to some embodiments, there is provided an interferometric device for optically measuring static and dynamic displacement. More particularly, there is provided a laser beam deflection and diffraction retro-reflective device for mechanical displacement and vibration measurement.

According to some embodiments, there are provided retro-reflective laser seismometer device and system for measurement of earthquake waves, underground pressure and force fluctuations, acoustic signals or the like, without need for costly precision alignments of any optical parts. More particularly, there are provided retro-reflective laser seismometer device and system for use in earthquake warning systems, perimeter intrusion detection systems and warning systems that protect linear installations, such as piping systems, railway tracks, electricity lines, fences as well as for use in remote monitoring the operation of large electrical equipment.

According to some embodiments, there are provided a retroreflective laser device and system for use in radiation modulators based on radiation beams diffraction.

According to some embodiments, there are provided an improved interferometric method for displacement and vibration measurement utilizing an array of retro-reflectors.

According to some exemplary embodiments there is provided a retro-reflective laser interferometer device and system for displacement and vibration measurements including a radiation source and beam splitting element (such as diffraction grating) for providing at least two partial radiation beams. The beams are reflected back from an array of retro-reflectors and form an interference pattern at the far field on a two-dimensional image detector plane. The two-dimensional image detector is mounted in optically conjugate plane with a diffraction grating and captures a sequence of images of the interference patterns, resulting from recombination at small angle of at least two partial split beams of the diffraction grating different orders reflected back by the array of retro-reflectors. As result of the retro-reflectors array tilt or shape changes caused by an external force, the interference pattern are changed. An analyzing means processes sequence of images obtained from the two-dimensional image detector, to analyze the tilt dimensions and vibrations' amplitude and frequency.

According to some embodiments, there is provided a retro-reflective laser interferometer for high resolution three-axis measurements of angular displacement and vibration of a body.

In some embodiments, the interferometer includes a low coherence laser diode, diffraction grating for the laser beam splitting and attached to the body retro-reflective sheeting, which carries out recombination of the back reflected split beams. The retro-reflective sheeting is illuminated by at least two partial beams of the diffraction grating different orders that are reflected back and recombined at a small angle. The reflected back laser partial beams are configured in a changeable interference pattern in the far field, which can be changed by tilts or the mechanical vibrations of the body driven by an external force. An imaging system is focused on a plane optically conjugated with a diffraction grating plane and being in a far field of the body. The imaging system detects a sequence of an interference patterns, originated at and propagating from the retro-reflective sheeting. An analyzing means determines the body tilts dimensions or/and its vibrations amplitude and frequency by the image processing.

In some embodiments, the retro-reflective laser interferometer device may include an array of diffractive retro-reflectors, the array is susceptible to a mechanical vibration driven by an external force. The array is irradiated by a low coherence laser beam that reflected to a light detector. The array forms a diffraction pattern of the laser beam in a far field that can be changed by the body mechanical vibration in response to the external force. This diffraction pattern is detected by the light detector and analyzed by the analyzing means to measure amplitude and frequency of the vibration body.

According to another embodiment, the retro-reflectors array may include a plurality of micro-prisms, which reflects the monochromatic radiation beam and forms a diffraction pattern in the far field within the radiation beam that is changed by mechanical vibration driven by an external force. A radiation receiver configured to detect the radiation beam that returns (come back) from the retro-reflectors array and to convert the detected radiation into an electric signal; the radiation receiver responds to the diffraction pattern deflection resulting from the mechanical vibrations to generate an output signal which contains information about the mechanical vibrations. An analyzing means operationally coupled to the radiation receiver for measurement of amplitude and frequency of the mechanical vibration.

In some embodiments, as used herein, retro-reflectors can receive radiation energy and reflect such energy back in the direction from whence it came. A passive retro-reflector returns a signal with the same general characteristics of the incident signal, preferably with relatively high directional gain and relatively little spreading of the incident beam. Non-limiting examples of different types of retro-reflector structures include a corner-cube reflector, a horn reflector, a parabolic dish reflector, and a parabolic cylinder reflector.

In some embodiments, due to the exceptionally small divergence of the retroreflector beam (<0.1 mrad), the laser signal can be received from long distance. In some embodiments, if an array of corner-cube micro-prisms is used, radiation diffraction is occurred on this array. The diffraction pattern of a single equilateral triangular aperture is a symmetrical six-pointed star with a fat hub. Just as is the case for the pattern from the circular aperture, the hub of the star contains more than 80 percent of the light in the diffraction pattern and is the important element. Multiple arrays of triangular apertures all of the same size and all similarly oriented produce the same pattern save for interference minima which appear when using monochromatic light.

In some embodiments, the widest and sharpest fluctuations with angle of incidence and orientation occur with the type of retro-reflector that relies on total internal reflection. In current corner-cube micro-prism array, the minimum angle between the ray and the normal to the front face for which retro-reflection will be possible is about 22°, the maximum angle of incidence relative to the normal to the front face of the array is 60°.

In some embodiments, an active retro-reflector or retro-modulator may include a modulating device that can modulate the incident radiation beam.

In some exemplary embodiments, the retro-reflective array may be made from corner-cube micro-prisms formed on sheeting being applied on an oscillatory membrane that being exited by the vibration. This allows carrying out also multi-dimensional measurements.

In some embodiments, the micro-prism sheeting may be made completely from dielectric material (glass or plastic) so as to ensure perfect insulation and complete insensitivity towards electromagnetic fields, even high-frequency ones.

In some embodiments, an optical transceiver (including a radiation source and a receiver), may be situated at a great distance (for example, in the range of 1-100 kilometers) from the micro-prism sheeting.

In some embodiments, using a retro-reflective micro-prism sheeting that are manufactured in from dielectric material (such as plastic or glass) enables operation in particularly hostile environments, in locations which are difficult to gain access to, in particular in the presence of strong electric and magnetic fields present in electrical machines, at a great distance from the electronical part of the retro-reflective laser interferometer In further embodiments, the retro-reflective laser interferometer device and system is based on the optical detection of the movement of a vibrating cantilever. The cantilever may have one end fixed onto the vibrating body being analyzed, while the other, having an optical element, free end moves, with respect to the body.

In additional embodiments, the retro-reflected radiation beam may be modulated by surface-waves excited in an external device to which the retro-reflective sheeting is attached.

According to another embodiment, the retro-reflective laser interferometer may include an additional light detection means for high frequency vibration measurement. The light detection means may include a plurality of photodiodes.

According to some embodiments, there is provided a retro-reflective interferometer device for detection and/or measurement of displacements and/or rotations and/or mechanical vibrations, the device comprising:
   a transceiver unit comprising:
      at least one radiation source capable of emitting a radiation beam;
      at least one radiation receiver;
   a movable unit movably mounted with respect to said transceiver unit, said movable unit comprising:
      one or more movable elements that are susceptible to displacement and/or vibration by an external force;
      at least one retro-reflective element attached to at least one of said movable elements, wherein said retro-reflective element is capable of reflecting back the radiation beam to form a sequence of radiation patterns in a far field, wherein said radiation patterns are modified by the displacement or/and mechanical vibration of said movable element; and
   an analyzing element operationally associated with said radiation receiver for analyzing at least one of: a displacement change, an intensity change and/or a frequency change in said sequence of radiation patterns.

According to some embodiments, the device may further include a beam-splitting element, capable of splitting the radiation beam to at least two coherent partial beams; wherein the at least one radiation receiver is located in a plane optically coupled with a beam-splitting plane.

According to some embodiments, the device may further include a diffraction grating element, capable of splitting the radiation beam to at least two coherent partial beams.

In some embodiments, the at least one radiation receiver may be configured to detect said sequences of the radiation patterns generated by said at least one retro-reflective element, to convert the detected radiation into an electric signal; said radiation receiver is capable of generating an output signal in response to said radiation pattern changes resulting from said displacement or/and mechanical vibration of said movable element, the output signal comprises information regarding amplitude and/or frequency of said displacement or/and mechanical vibration. Each possibility is a separate embodiment.

According to some embodiments, the retro-reflective element of the device may be in the form of retro-reflective sheeting.

According to some embodiments, the retro-reflective sheeting of the device may include an array of corner-cube micro-prisms, an array of cat-eye micro-reflectors, a fiber-optic back reflection bundle, MEMS mirrors or combinations thereof. Each possibility is a separate embodiment.

According to some embodiments, the retro-reflective element, including a retro-reflective diffractive microstructure, is capable of reflecting back said radiation beam and to form a diffraction pattern in the far field, said diffraction patterns are modified by the mechanical vibration or/and displacement driven by the external force.

According to some embodiments, the beam-splitting element may be selected from a diffraction grating, cube beam-splitter, mirror beam-splitter, wedged beam-splitter, and Wollaston polarizer or any combination thereof. Each possibility is a separate embodiment.

According to some embodiments, the transceiver unit may be stationary.

According to some embodiments, the transceiver unit, the movable unit and/or the analyzing element may be situated/located in a single or discrete housings. In some embodiments, the discrete housings are functionally and/or physically associated.

According to some embodiments, the housings have a shape selected from: a pipe, a Quadrilateral or tubular like shape. Each possibility is a separate embodiment.

According to some embodiments, the movable elements may include a pipe, a pendulum, a spring, a pendulum based spring cantilever, a membrane, a float, or any combination thereof. Each possibility is a separate embodiment.

According to some embodiments, the radiation source may be selected from a low coherence radiation beam, high coherence radiation beam, a laser diode, a solid-state laser, a liquid laser, a gas laser, LEDs, a spectrometer and a monochromatic light source.

In some embodiments, the at least one radiation receiver is selected from: a CCD or CMOS image sensor a video camera, a photodiode array, a position-sensitive light detector (PSD), a single photodiode or a suitable imaging element. Each possibility is a separate embodiment.

According to some embodiments, wherein the analyzing element may include an image processing unit, a computer, a programmed electronic processor, and/or a microcontroller. Each possibility is a separate embodiment.

According to some embodiments, the device may further include an alert unit configured to issue an alert based on a signal from the analyzing element.

In some embodiments, when used for detection of low frequency vibration and displacement, the movable element may be in a form of a pipe, wherein said movable element is connected by a hose or a swivel joint to a stationary housing harboring the transceiver unit, said stationary housing is in a shape of a pipe, whereby low frequency vibrations or/and displacement of said movable element causes tilt change of said retro-reflective element relative to said radiation beam such that said tilt is being proportional to the vibration amplitude or/and displacement to be measured.

In some embodiments, when used for detection of low frequency vibration and vertical displacement, said movable element may be in a form of a heavy mass that includes a retro-reflective element movably connected to a stationary housing, harboring the transceiver unit, said stationary housing is in a shape of a vertical mounted pipe, whereby low frequency vibrations or/and vertical displacement of said heavy mass causes tilt change of said retro-reflective element relative to said radiation beam such that said tilt is being proportional to the vibration amplitude or/and vertical displacement to be measured In some embodiments, when used for detection of high frequency vibration, the retro-reflective element, having a form of a retro-reflective sheeting extended transversely to said radiation beam, may be attached to a spring cantilever or/and membrane, whereby each vibration of said cantilever or/and membrane causes the retro-reflective sheeting parts to change their tilts to modulate the radiation, said modulation being detected, and being related to the vibration or/and displacement to be measured.

In some embodiments, the radiation source may be mounted on a spring cantilever, whereby each vibration of the cantilever causes the radiation beam to move transversely relative to the retro-reflective sheeting in such manner that tilt of the radiation beam relative to the retro-reflective sheeting is being proportional to the vibration or/and displacement to be measured.

In some embodiments, the transparent diffraction grating may have a reflective non transparent structure that reflect said diffraction and interference patterns to a second radiation receiver, which can detect high frequency vibrations.

According to some embodiments, optical conjugation of the at least one radiation receiver plane with said radiation pattern plane may carried out by an image system.

According to some embodiments, the device may be for use in high resolution three-axis detection and/or measurement of sources of displacement or/and mechanical vibrations.

In some embodiments, the device may have three light sources having different wavelengths and a suitable detector, capable of mechanical separation and detection of said three axis.

According to some embodiments, the device may be used in detection of earth movement, perimeter security and/or tunneling detection wherein: the housings are in the form of a pipe; the movable elements are in the form of a pipe, a pendulum based spring cantilever and/or a membrane; the at least one radiation source is a laser diode; the at least one radiation receiver is an image camera; and the at least one retro-reflective element is in the form of retro-reflective sheeting. Each possibility is a separate embodiment.

According to some embodiments, the device may be used in detection of movement of a subject body, wherein: the housings are in the form of a pipe configured to be attached to a base of a platform; the movable elements are in the form of a pendulum based spring, cantilever or/and a membrane; the at least one radiation source is a laser diode; the at least one radiation receiver is an image sensor; and the at least one retro-reflective element is in the form of retro-reflective sheeting. Each possibility is a separate embodiment. According to some embodiments, the platform may be a bed or a crib. In some embodiments, the subject may be an infant.

According to some embodiments, the device may include an alert unit, the alert unit is configured to issue an alert when no movement is detected over a predetermined period of time.

According to some embodiments, there is provided a method for measurement of displacements and/or mechanical vibrations of a movable element caused by an external force, the method comprising the steps of:
irradiating at least one retro-reflective element by one or more radiation beams;
reflecting back said one or more radiation beams by the at least one retro-reflective element to a radiation receiver located at a plane optically conjugated with the radiation beam plane, being in a far field of said movable element, wherein a radiation pattern is formed by said radiation beam as result of reflection from the at least one retro-reflective element;
detecting of a sequence of said retro-reflective radiation patterns in the far field by said radiation receiver; said radiation patterns are modified in displacement or intensity distribution thereof, by mechanical vibration or/and displacement of said movable element caused by the external force;
converting said sequence of the radiation patterns into a digital signal indicative of the movement of said movable element in response to said external force; and
determining, by an analyzing unit, amplitudes and frequencies of the detected vibrations and/or displacement values by processing of said radiation patterns sequence.

According to some embodiments, the method may further include splitting the radiation beam by a beam-splitting element to multiple diffraction orders and using for the measurement at least two coherent partial beams; wherein the radiation receiver is located at a plane optically conjugated with a beam splitting plane. In some embodiments, the radiation beams may be selected from a low coherence radiation beam, high coherence radiation beam, a laser diode, a solid-state laser, a liquid laser, a gas laser, LED, a spectrometer and a monochromatic light source. Each possibility is a separate embodiment.

In some embodiments, the radiation beams splitting element may be selected from a diffraction grating, cube beam-splitter, mirror beam-splitter, wedged beam-splitter, and Wollaston polarizer or any combination thereof. Each possibility is a separate embodiment.

In some embodiments, the retro-reflective element may include sheeting with an array of corner-cube micro-prisms or an array of cat-eye micro-reflectors.

In some embodiments, the optical conjugation of the main radiation receiver plane with the beam-splitting plane may be carried out by an image system.

In some embodiments, the method may include a step of issuing an alert based on a signal from the analyzing unit.

In some embodiments, in the method, when the external force is applied along the retro-reflective sheeting and modifies its shape, longitudinal displacement of a part of said retro-reflective sheeting causes its magnified transversal displacement and respective tilts of particular parts of said retro-reflective sheeting; and/or the tilts of the particular parts/portions of the reflective sheeting causes said radiation pattern displacement or changing the intensity distribution thereof in the plane of said radiation receiver.

According to some embodiments, there is provided a method for measurement of mechanical vibrations or/and displacements of a movable element caused by an external force, comprising one or more of the steps of:
irradiating an array of diffractive retro-reflectors, associated with a movable element, with a radiation beam that is reflected back to a radiation receiver; wherein the array forms a changeable diffraction beam pattern in a far field, which is modified by mechanical vibration or/and displacement of the movable element in response to the external force;
detecting said changeable diffraction pattern by said radiation receiver; and
analyzing the changes by an analyzing unit, to determine amplitude and frequency of the movable element vibration or/and displacement.

In some embodiments, the relation between intensities of back reflected and diffracted radiation from the retro-reflective array may be used for measurement of distance between said movable element and radiation receiver.

According to some embodiments, there is provided a system for detection and measurement of displacement or/and mechanical vibrations of a surface at a remote location, the system comprising:

a transceiver unit comprising:
- at least two monochromatic radiation sources capable of emitting radiation beams having different wavelengths;
- a beam-splitting element, capable of splitting said radiation beams to at least two coherent partial beams of each wavelength;
- a radiation receiver located in a plane optically coupled with a beam-splitting plane;

a movable unit at a remote location movably mounted with respect to said transceiver unit, said movable unit comprising:
- one or more movable elements that are susceptible to displacement and/or vibration by an external force applied on or at a surface;
- a retro-reflective element attached to at least one of said movable elements surface, wherein said retro-reflective element is capable of reflecting back the at least two coherent partial beams of each wavelength generated by the beam-splitting element, to form a sequence of interference patterns in a far field, wherein said patterns are modified by the displacement or/and mechanical vibration of said movable element;

an analyzing element operationally associated with said radiation receiver for analyzing at least one of: a displacement change, an intensity change and/or a frequency change in said sequence of interference patterns; and a transmitter unit configured to transmit data obtained from the analyzing element to a remote location.

In some embodiments, the system may be for use in high resolution three-axis detection and/or measurement of sources of displacement or/and mechanical vibrations.

In some embodiments, the system may include three light sources having different wavelengths, and a suitable detector capable of mechanical separation and detection of said three axis.

In some embodiments, the system may be for use in detection of earth movement, perimeter security and/or tunneling detection.

In some embodiments, the system may be for use in detection of movement of a subject body.

According to some embodiments, there is provided a retro-reflective interferometer device for detection and/or measurement of displacement or/and mechanical vibrations (optionally at a remote location), the device includes:
a transceiver unit comprising:
- a) at least one radiation source capable of emitting a radiation beam;
- b) a diffraction grating element, capable of splitting said radiation beam to at least two coherent partial beams;
- c) at least one radiation receiver located in a plane optically coupled with a diffraction grating plane;

a movable unit movably mounted with respect to said transceiver unit, said movable unit comprising:
- a) one or more movable elements that are susceptible to displacement and/or vibration by an external force;
- b) at least one retro-reflective element attached to at least one of said movable elements, wherein said retro-reflective element is capable of reflecting back the at least two coherent partial beams generated by the diffraction grating element, to form a plurality or sequence of interference patterns in a far field, wherein said interference patterns are modified by the displacement or/and mechanical vibration of said movable element; and an analyzing element operationally associated with said radiation receiver for analyzing at least one of: a displacement change, an intensity change and/or a frequency change in said sequence of interference patterns.

According to some embodiments, the device may be used for high resolution three-axis detection and/or measurement of various sources of displacement or/and mechanical vibrations.

According to some embodiments, there is provided a system for detection and measurement of displacement or/and mechanical vibrations of a surface (optionally, at a remote location), the system includes:
a transceiver unit comprising:
- a) at least two monochromatic radiation source capable of emitting radiation beams with different wavelengths;
- b) a diffraction grating element, capable of splitting said radiation beams to at least two coherent partial beams of each wavelength;
- c) a radiation receiver located in a plane optically coupled with a diffraction grating plane;

a movable unit at a remote location movably mounted with respect to said transceiver unit, said movable unit comprising:
- a) one or more movable elements that are susceptible to displacement and/or vibration by an external force applied on or at a surface;
- b) a retro-reflective element attached to at least one of said movable elements surface, wherein said retro-reflective element is capable of reflecting back the at least two coherent partial beams of each wavelength generated by the diffraction grating element, to form a sequence of interference patterns in a far field, wherein said patterns are modified by the displacement or/and mechanical vibration of said movable element;

an analyzing element operationally associated with said radiation receiver for analyzing at least one of: a displacement change, an intensity change and/or a frequency change in said sequence of interference patterns; and a transmitter unit configured to transmit data obtained from the analyzing element to a remote location.

According to some embodiments, the at least one radiation receiver of the system may be configured to detect said sequences of the interference patterns generated by said at least one retro-reflective element, to convert the detected radiation into an electric signal; said radiation receiver is capable of generating an output signal in response to said interference pattern changes resulting from said displacement or/and mechanical vibration of said movable element, the output signal comprises information regarding amplitude and/or frequency of said displacement or/and mechanical vibration.

According to some embodiments, the retro-reflective element of the system may be in the form of retro-reflective sheeting. In some embodiments, the retro-reflective sheeting may include an array of corner-cube micro-prisms, an array of cat-eye micro-reflectors, a fiber-optic back reflection bundle, MEMS mirrors, or any combination thereof.

According to some embodiments, the retro-reflective element of the system may include a retro-reflective diffractive microstructure that is capable of reflecting back said radiation beam and to form a diffraction pattern in the far field, said diffraction patterns are modified by the mechanical vibration or/and displacement driven by the external force.

According to some embodiments, the transceiver unit of system is stationary.

According to some embodiments, the transceiver unit, the movable unit and/or the analyzing element of the system may be situated (located) in a single or discrete housings, said discrete housings are functionally and/or physically associated. Each possibility is a separate embodiment.

In some embodiments, the transceiver unit of the system may be located at a distance of 0.5 m-100 km (and any subranges thereof) with respect to the movable unit. In some embodiments, the distance is a horizontal distance.

According to some embodiments, the housing(s) of the system may include, or be in a shape selected from: a pipe, a Quadrilateral, or other tubular like shape.

According to some embodiments, the movable elements of the system may include a pipe, a pendulum, a spring, a pendulum based spring cantilever, a membrane, a float, or any combination thereof.

According to some embodiments, a beam-splitting element may be selected from a cube beamsplitter, mirror beamsplitter, wedged beamsplitter, Wollaston polarizer, and the like, or any combination thereof. Each possibility is a separate embodiment.

In some embodiments, the path difference between two beams from a beam-splitter element to an image sensor should be short (for example, less than about 1 mm) when using low coherent laser diode.

In some embodiments, the radiation source of the system may be selected from a low coherence radiation beam, high coherence radiation beam, a laser diode, a solid-state laser, a liquid laser, a gas laser, a light emitting diode (LED), a spectrometer and a monochromatic light source.

According to some embodiments, the at least one radiation receiver of the system may be selected from: a CCD or CMOS image sensor a video camera, a photodiode array, a position-sensitive light detector (PSD), a single photodiode and suitable imaging element.

According to some embodiments, the analyzing element of the system may include an image processing unit, a computer, a CPU, a programmed electronic processor, and a microcontroller.

In some embodiments, the transmitter unit of the system may include any suitable type of transmitter unit, (wired and/or wireless). In some embodiments, the transceiver unit may include a separable transmitter element and a separable receiver element that may be functionally and/or physically associated. In some embodiments, the information transmitted may include any type of information, including, but not limited to: a radio signal, an electronic signal, and the like. In some embodiments, the data may include any type of data, including, but not limited to: audio signal (sound), a visual signal (for example, a video signal), or any type of wireless signal (such as, a digital signal). In some embodiments, the transmitter is a transceiver. In some embodiments, the data transmitted from the transmitter unit is received by a suitable receiver located at the remote location.

According to some embodiments, the system may be used for high resolution three-axis detection and/or measurement of various sources of displacement or/and mechanical vibrations.

According to some embodiments, the system may be used for detection of earth movement, perimeter security and/or tunneling detection.

According to additional embodiments, there is further provided a method for recording of displacement and vibrations of a body or, more generally, of a physical system. The method may be substantially characterized in: that displacing and/or vibrating elements, which include arrays of retro-reflectors and/or a source of electromagnetic radiation and/or optical receiver and/or other optical elements, are mechanically connected to the system on which the displacement and vibration measurements are to be carried out; that a beams of electromagnetic radiation is splitted into at least two coherent beams reflected and diffracted by the arrays of retro-reflectors; deflected during the displacements and/or vibrations; collected in order to generate a signal which is a function of the position of the displacing and/or vibrating elements; and that the signal is recorded by a recording means and processed in order to determine the parameters relating to the displacements and/or vibrations to be measured.

According to some embodiments, there is provided a method for measurement of displacements and/or mechanical vibrations of a movable element caused by an external force, the method include one or more of the steps of:

Irradiating at least one retro-reflective element by a radiation beam via a beam-splitting element (such as, a diffraction grating);

splitting said radiation beam by said beam-splitting element to multiple diffraction orders and using for the measurement at least two coherent partial beams;

reflecting back said at least two coherent partial beams by the at least one retro-reflective element to a radiation receiver located at a plane optically conjugated with a beam-splitting element (such as, diffraction grating) plane and being in a far field of said movable element, wherein said partial beams form an interference patterns;

detecting a plurality or sequence of said retro-reflective interference patterns in the far field by said radiation receiver; said interference patterns are modified (displaced or changed their intensity distribution) by mechanical vibration or/and displacement of said movable element caused by the external force;

converting said sequence of the interference patterns into a digital signal indicative of the movement of said movable element in response to said external force; and determining, by an analyzing unit, amplitudes and frequencies of the detected vibrations and/or displacement values by processing of said interference patterns sequence.

In some embodiments, the processing includes a mathematical processing.

According to some embodiments, the radiation beam may be selected from a low coherence radiation beam, high coherence radiation beam, a laser diode, a solid-state laser, a liquid laser, a gas laser, LED, a spectrometer and a monochromatic light source and any combination thereof. Each possibility is a separate embodiment.

According to some embodiments, the retro-reflective element may include sheeting with an array of corner-cube micro-prisms or an array of cat-eye micro-reflectors.

According to some embodiments, the optical conjugation of the main radiation receiver plane with said diffraction grating plane is carried out by an image system.

According to some embodiments, the beam-splitting element may be selected from a diffraction grating, cube beamsplitter, mirror beamsplitter, wedged beamsplitter, Wollaston polarizer, and the like, or any combination thereof. Each possibility is a separate embodiment.

According to some embodiments, the external force is applied on or along the retro-reflective (optionally flexible) sheeting to modify its shape; longitudinal displacement of a part of said retro-reflective sheeting causes its magnified transversal displacement (convexity or cavity) and respective tilts of particular parts of said retro-reflective sheeting; and the tilts of the particular parts of the reflective sheeting causes said interference pattern displacement or changing its intensity distribution in the plane of said radiation receiver.

According to some embodiments, the relation between intensities of zero-order and first or/and higher diffraction orders of said radiation beam may be used for distance measurement between said movable element and radiation detector.

According to some embodiments, there is provided a method for measurement of mechanical vibrations or/and displacements of a movable element caused by an external force, including one or more of the steps of:

irradiating an array of diffractive retro-reflectors, associated with a movable element, with a radiation beam that is reflected back to a radiation detector; wherein the array forms a changeable diffraction beam pattern in a far field, which is modified by mechanical vibration or/and displacement of the movable element in response to the external force;

detecting said changeable diffraction pattern by said radiation detector; and analyzing the changes by an analyzing unit, to determine amplitude and frequency of the movable element vibration or/and displacement.

Reference is now made to FIG. 1, which illustrates a general scheme of a retro-reflective laser interferometer device, according to some embodiments. The exemplary device illustrated in FIG. 1 includes of a light transceiver 1 and a remote retro-reflective sheeting 6 attached to a movable body 7 tilted in response to external force 8. The light transceiver 1 includes a laser diode 2, a transmission grating 3, a collimating lens 4, a beam-splitter 5, an image lens 9, an image camera 10 and a microcomputer 11. The laser diode 2 directs its beam through the transmission grating 3 that splits the laser beam to multiple diffraction beams (+1-st, 0 and −1-st diffraction orders, for example). These multiple diffraction beams are collimated by the collimating lens 4 and directed via the beam-splitter 5 to the remote retro-reflective sheeting 6 attached to the movable body 7. The back reflected multiple diffraction beams are focused by the image lens 9 into plane of the image camera 10 where they form interference fringes patterns. The image camera captures a sequence of images of this interference fringes patterns that are processed by the microcomputer 11.

In some embodiments, displacements and vibrations of the retro-reflective sheeting cause its tilt, resulting in the interference fringes displacement.

Figure 2:
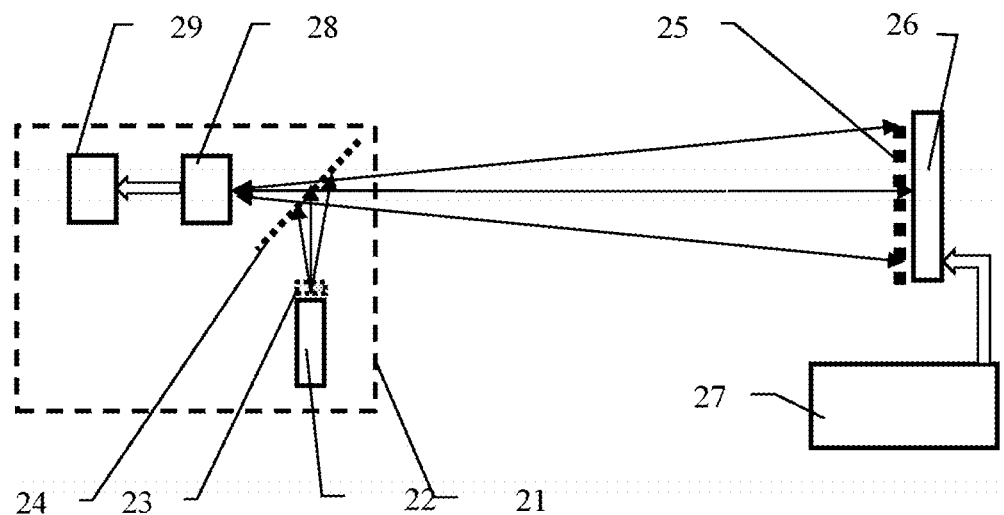
FIG. 2—a simplified schematic illustration of a retro-reflective laser interferometer, according to some embodiments.

Reference is now made to FIG. 2, which illustrates a simplified scheme of a retro-reflective laser interferometer device, according to some embodiments. The device illustrated in FIG. 2 includes a light transceiver 21 and a remote retro-reflective sheeting 25 attached to a movable body 26 tilted in response to external force 27. The light transceiver 21 includes a laser diode 22, a transmission grating 23, a beam-splitter 24, an image camera 28 and a microcomputer 29. The laser diode 22 directs its beam to the transmission grating 23 that splits the laser beam to multiple diffraction beams. These multiple diffraction beams are directed via the beam-splitter 24 to the remote retro-reflective sheeting 25 attached to the movable body 26. The back reflected multiple diffraction beams are intersected at the plane of the image camera 28 placed at the same distance from the beam-splitter like the transmission grating and form interference fringes patterns. The image camera captures a sequence of images of this interference fringes patterns that are processed by the microcomputer 29. In some embodiments, displacements and vibrations of the retro-reflective sheeting cause its tilts resulting in the interference fringes displacement.

Figure 3:
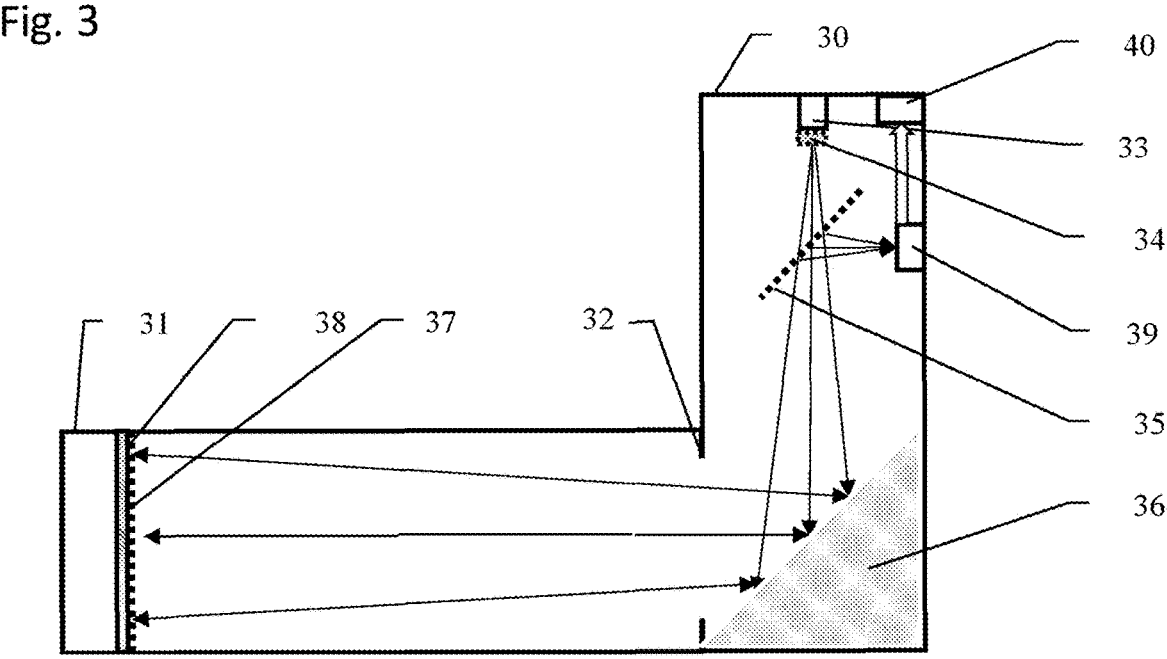
FIG. 3—a schematic illustration of a three-axial retro-reflective laser seismometer for low frequency measurements, according to some embodiments.

Reference is now made to FIG. 3, which illustrates a scheme of a three-axial retro-reflective laser seismometer device for low frequency measurements of ground waves, according to some embodiments. The exemplary device illustrated in FIG. 3 includes a stationary pipe 30 and a movable pipe 31 that connected to the stationary pipe by a hose or a swivel joint 32. Low frequency vibrations or/and displacement of the movable pipe 31 causes changing its tilt relative to the stationary pipe 30. This tilt is being proportional to the vibration amplitude or/and displacement to be measured.

A laser diode 33, mounted in the stationary pipe 30 directs its beam to a transmission grating 34 that splits the laser beam to multiple diffraction beams. This multiple diffraction beams are directed via a beam-splitter 35 and a mirror 36 to a remote retro-reflective sheeting 37 attached to a diaphragm 38, mounted in the movable pipe 31. The back reflected multiple diffraction beams are intersected at the plane of an image camera 39, placed at the same distance from the beam-splitter 35 like the transmission grating 34, and form an interference fringes patterns that recorded by the image camera 39 A sequence of images, captured by the image camera 39, are processed by a microcomputer 40. Vibrations and displacements of the movable pipe 31 and the diaphragm 38 cause their tilts relative to the stationary pipe 30 resulting in the interference fringes displacement.

Figure 4:
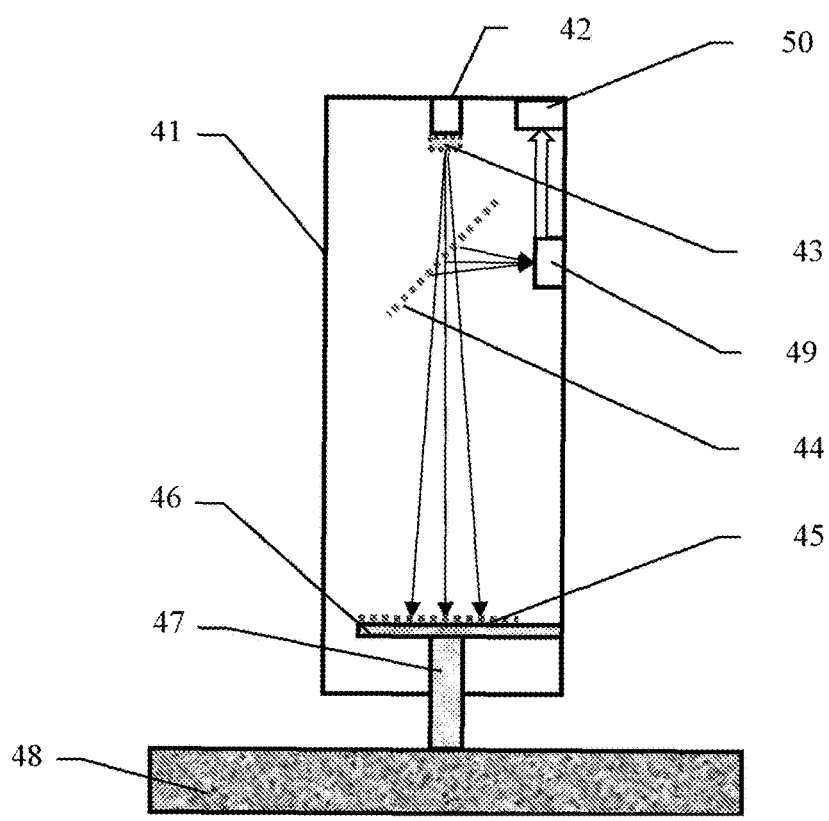
FIG. 4—a schematic illustration of a vertical retro-reflective laser seismometer for vertical displacement measurements, according to some embodiments.

Reference is now made to FIG. 4, which illustrates a scheme of a vertical retro-reflective laser seismometer device for vertical displacement measurements of ground, according to some embodiments. The exemplary device illustrated in FIG. 4 includes a laser diode 42, mounted in a stationary vertical pipe 41, directing its beam to a transmission grating 43 that splits the laser beam to multiple diffraction beams. This multiple diffraction beams are directed via a beam-splitter 44 to a remote retro-reflective sheeting 45 that attached to a spring cantilever 46 supported by the stationary pipe 41. The cantilever 46 via a pin 47 is connected with heavy mass 48 that subjected to displacement in vertical direction along the laser beam direction. The back reflected multiple diffraction beams are intersected at the plane of an image sensor 49 connected to a microcomputer 50 that processes a sequence of the interference fringes patterns detected by the image sensor 49. Vertical displacements of the heavy mass 48 are transmitted to the retro-reflective sheeting 45 via the cantilever 46 and resulting in its tilt that causes displacement of the interference fringes.

In some embodiments, devices and systems of the disclosed retro-reflective laser seismometers can be used for various applications, including, detecting very small displacements of ground caused by underground digging activities.

Figure 5:
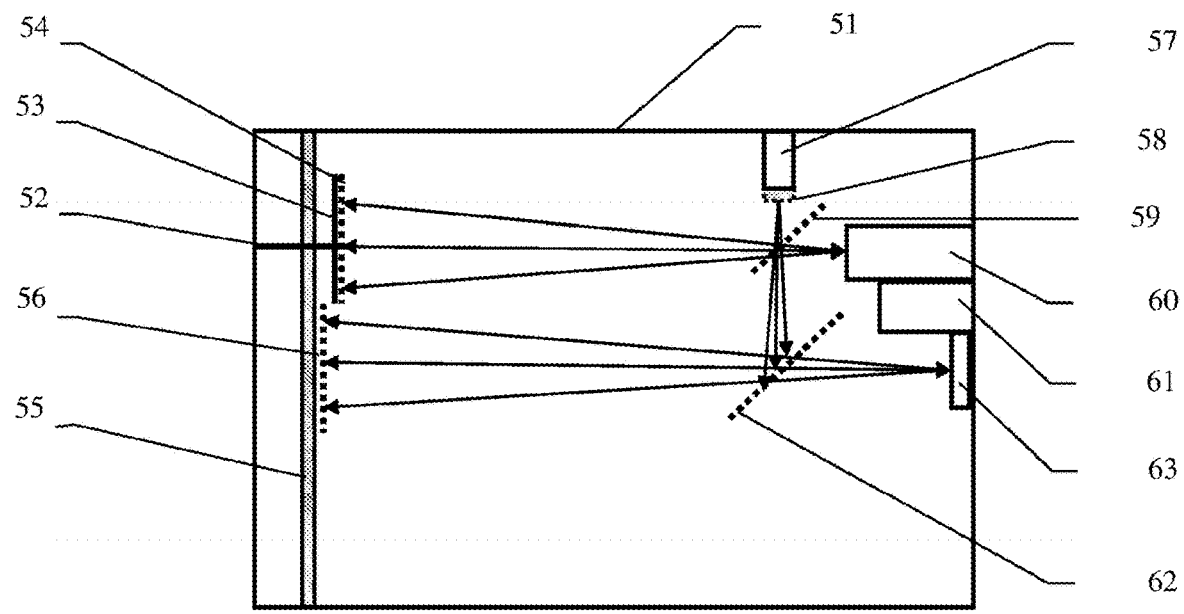
FIG. 5—a schematic illustration of a three-axial retro-reflective Laser Seismometer for high frequency measurements; according to some embodiments.

Reference is now made to FIG. 5, which illustrates a scheme of a retro-reflective laser seismometer device for high frequency measurements, according to some embodiments. The exemplary device illustrated in FIG. 5 includes a stationary pipe 51 that supports via a spring cantilever 52 a pendulum mass 53 with attached a retro-reflective sheeting 54, which is subjected to displacements in two directions perpendicular to a laser beam direction. A diaphragm 55 with attached a retro-reflective sheeting 56 is subjected to displacements along the laser beam direction. In first channel, a laser diode 57, mounted in the stationary pipe 51 directs its beam to a transmission grating 58 that splits the laser beam to multiple diffraction beams. This multiple diffraction beams are directed via a beam-splitter 59 to the remote retro-reflective sheeting 54. The back reflected multiple diffraction beams are intersected at the plane of a photodiode array 60 connected to a microcomputer 61 that processes a sequence of the interference fringes patterns detected by the photodiode array 60. In second channel, the multiple diffraction beams from the laser diode 57 are directed via beam-splitters 59 and 62 to the retro-reflective sheeting 56 attached to the diaphragm 55. The back reflected multiple diffraction beams are intersected at the plane of a photodiode array 63 placed at the same distance from the beam-splitter 62 like the transmission grating 58, and form an interference fringes patterns that recorded by the photodiode array 63. A sequence of the interference fringes patterns detected by the photodiode array 63 are processed by a microcomputer 61. Vibrations and displacements of the pendulum mass 53 and the diaphragm 55 are transmitted to the retro-reflective sheeting 54 and 56 accordingly. As result, the sheeting are inclined that causes displacement of the interference fringes.

In some embodiments, devices and systems of the disclosed retro-reflective laser seismometers can be used for various applications, including, detecting very weak vibrations of ground caused by underground digging activities.

Figure 6:
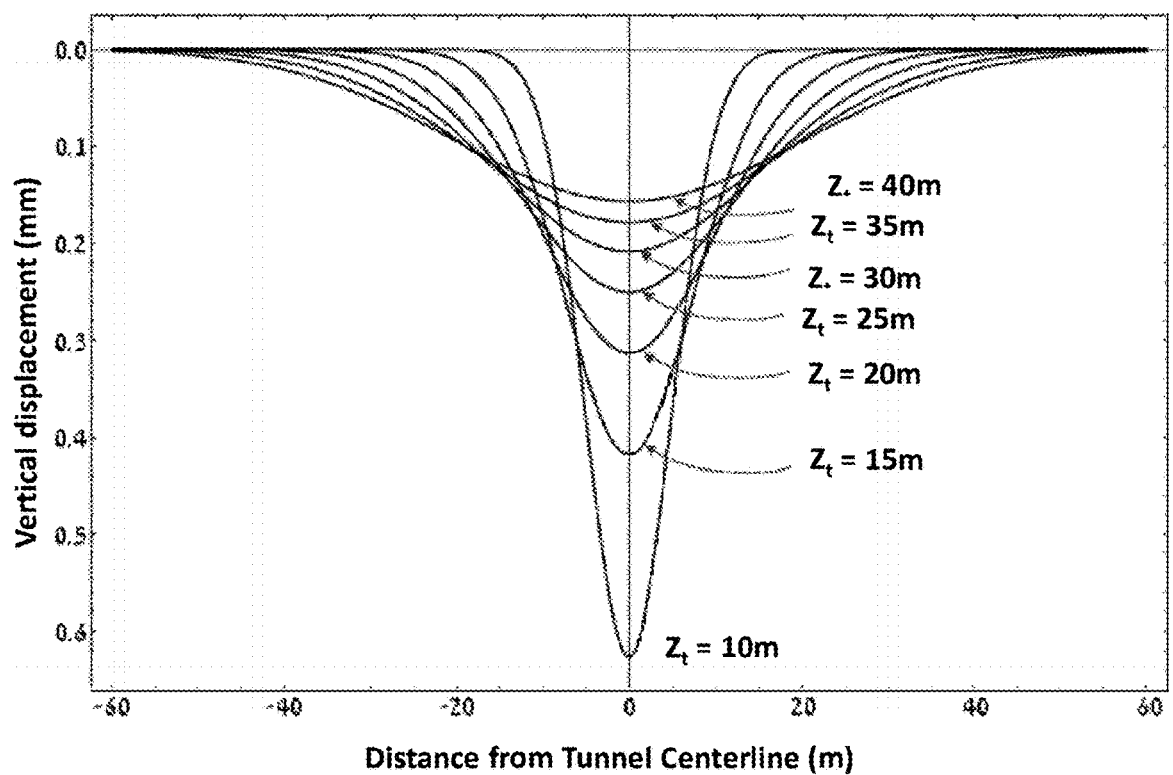
FIG. 6—an exemplary graph showing vertical sand settlement above an exemplary tunnel (having an exemplary diameter of 1 m), according to some embodiments.
Figure 7:
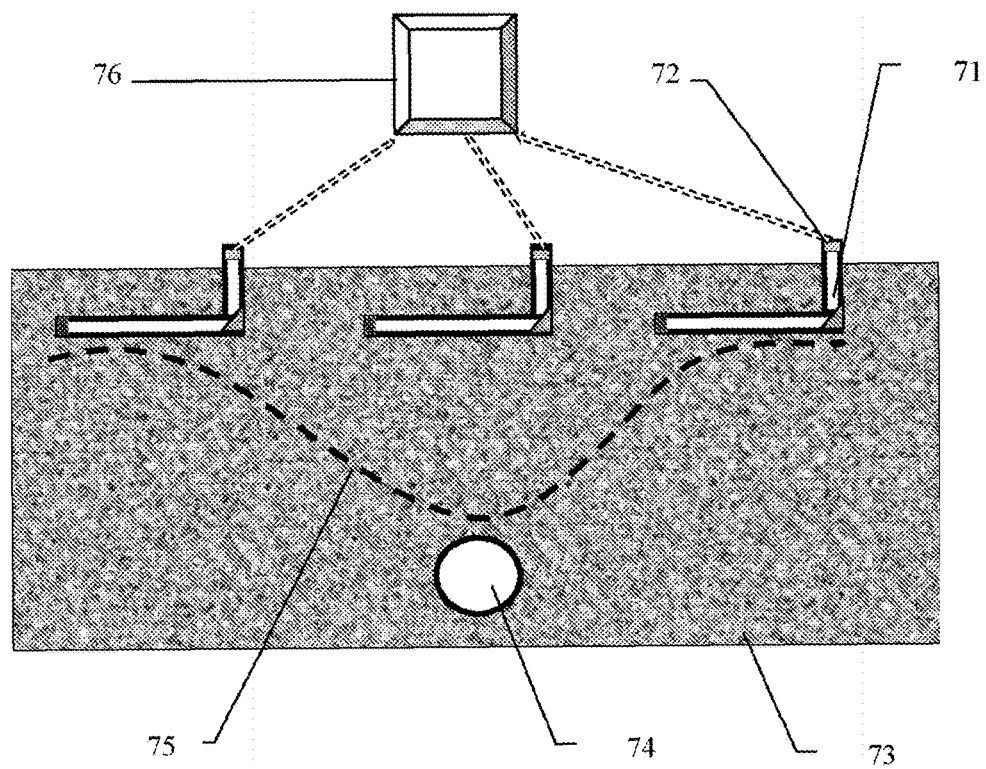
FIG. 7—a schematic illustration of a retro-reflective laser seismometer system for tunneling detection, according to some embodiments.

Reference is now made to FIG. 6 and FIG. 7, which illustrate an example of illegal underground tunnels detection, according to some embodiments.

Underground excavation in soil causes substantial deformations in the medium, which are not limited to the immediate vicinity of the excavation. FIG. 6 shows a simulation of the sand settlement caused by tunnel of 1 m diameter, excavated at depths of 10 m, 15 m, 20 m, 25 m, 30 m, 35 m and 40 m.

A scheme of a retro-reflective laser seismometers system for tunneling detection is illustrated in FIG. 7. The exemplary system includes a plurality of three-axis retro-reflective laser seismometers 71, having a wireless data transmitter 72, buried at shallow depth in soil along a border. The retro-reflective laser seismometers are mounted in sand 73 at depth of 1 m in horizontal manner. A tunnel 74 in excavation process causes the sand settlement 75 that is detected by at least three retro-reflective laser seismometers. Data from the laser seismometers are transduced by the wireless data transmitter 72 to a central computer 76 that carries out their on-line analyzing for noises filtration (natural soil settlements, rain, wind, traffic and etc.) and making decision about an intrusion according to alarm data of at least three laser seismometers.

In this example, the tunnel in 1 m diameter can be detected at depth to 40 m and more by measurement of the sand displacement above the tunnel. Data comparison of the next adjacently located three retro-reflective laser seismometers allows the tunnel location with 0.5 m accuracy. Unlike currently used instrumentations, the disclosed advantageous 3-axis laser seismometer device and system can detect not only vibrations in wide range of frequencies with very low amplitudes (digging, drilling, scraping, jack-hammering, etc.), but also very small displacements of soil where it placed. Thereby, it will allow the detection and localization of small hand-dug tunnels that are considered extremely problematic.

Figure 8:
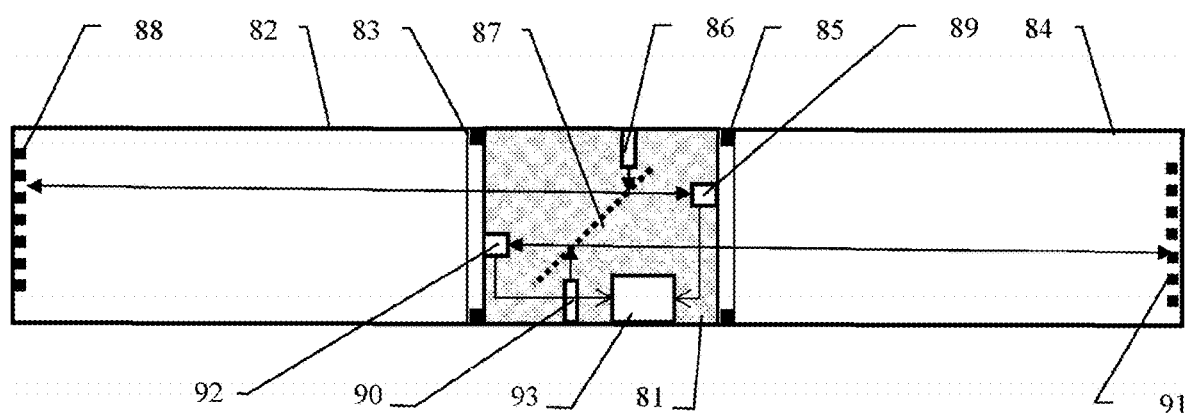
FIG. 8—a schematic illustration of a Retro-reflective laser seismometer used in Perimeter Security setting, according to some embodiments.

Reference is now made to FIG. 8, which illustrates an example of a retro-reflective laser seismometer device, used in perimeter security setting, according to some embodiments. The exemplary device illustrated in FIG. 8 includes a stationary pipe 81 and movable pipes 82 and 84 connected to the pipe 81 by hoses or swivel joints 83 and 85 accordingly. The stationary pipe 81 includes a laser diode 86, a beam-splitter 87, a corner-cube micro-prism sheeting 88 and an image camera 89 that form the first optical channel. A laser diode 90, the beam-splitter 87, a corner-cube micro-prism sheeting 91 and an image camera 92 form the second optical channel. A sequence of images from the image cameras 89 and 92 are analyzed by a microcomputer 93. The laser diodes 86 and 90 direct a light beam to the remote corner-cube micro-prism sheeting 88 and 91 accordingly. The sheeting 88 and 91 are attached to bottoms of the movable pipes 82 and 84 accordingly that can be displaced or/and vibrated in response to an external force.

The corner-cube micro-prism sheeting 88 and 91 are configured to reflect back the laser beam in the direction from whence it came. Therefore, a substantial portion of the incident laser beam is returned to its source with little spreading caused by the radiation diffraction on the micro-prisms. So, the corner-cube micro-prism sheeting forms a diffraction light pattern of the laser beam at the far field that captured by the image cameras 89 and 92. The outputting images are processed by the microcomputer 93.

Displacements or/and mechanical vibrations of the movable pipes 82 and 84 results in tilt of the corner-cube micro-prism sheeting that, in turn, causes displacements of the diffraction light pattern. The corner-cube micro-prisms sheeting have 0.4 mm thickness and 0.3 mm pitch between the micro-prisms.

According to some embodiments, there is provided a retro-reflective interferometer device for detection and/or measurement of displacements and/or rotations and/or mechanical vibrations, the device comprising:
  a transceiver unit comprising:
    at least one radiation source capable of emitting a radiation beam;
    a beam-splitting element, capable of splitting said radiation beam to at least two coherent partial beams;
    at least one radiation receiver located in a plane optically coupled with a beam-splitting plane;
  a movable unit movably mounted with respect to said transceiver unit, said movable unit comprising:
    one or more movable elements that are susceptible to displacement and/or vibration by an external force;
    at least one retro-reflective element attached to at least one of said movable elements, wherein said retro-reflective element is capable of reflecting back the at least two coherent partial beams generated by the beam-splitting element, to form a sequence of interference patterns in a far field, wherein said interference patterns are modified by the displacement or/and mechanical vibration of said movable element; and
  an analyzing element operationally associated with said radiation receiver for analyzing at least one of: a displacement change, an intensity change and/or a frequency change in said sequence of interference patterns.

According to some embodiments, the at least one radiation receiver is configured to detect said sequences of the interference patterns generated by said at least one retro-reflective element, to convert the detected radiation into an electric signal; said radiation receiver is capable of generating an output signal in response to said interference pattern changes resulting from said displacement or/and mechanical vibration of said movable element, the output signal comprises information regarding amplitude and/or frequency of said displacement or/and mechanical vibration.

In some embodiments, the retro-reflective element is in the form of retro-reflective sheeting. In some embodiments, the retro-reflective sheeting comprises an array of corner-cube micro-prisms, an array of cat-eye micro-reflectors, a fiber-optic back reflection bundle, MEMS mirrors or combinations thereof.

In some embodiments, the retro-reflective element, comprising a retro-reflective diffractive microstructure, is capable of reflecting back said radiation beam and to form a diffraction pattern in the far field, said diffraction patterns are modified by the mechanical vibration or/and displacement driven by the external force.

In some embodiments, the beam-splitting element may be selected from a diffraction grating, cube beam-splitter, mirror beam-splitter, wedged beam-splitter, and Wollaston polarizer or any combination thereof.

In some embodiments, the transceiver unit may be stationary.

In some embodiments, the transceiver unit, the movable unit and/or the analyzing element may be situated in a single or discrete housings, said discrete housings are functionally and/or physically associated. In some embodiments, the housings may have a shape selected from: a pipe, a Quadrilateral or tubular like shape.

In some embodiments, the movable elements may include a pipe, a pendulum, a spring, a pendulum based spring cantilever, a membrane, a float, or any combination thereof.

In some embodiments, the radiation source may be selected from a low coherence radiation beam, high coherence radiation beam, a laser diode, a solid-state laser, a liquid laser, a gas laser, LEDs, a spectrometer and a monochromatic light source.

In some embodiments, the at least one radiation receiver is selected from: a CCD or CMOS image sensor a video camera, a photodiode array, a position-sensitive light detector (PSD), a single photodiode or a suitable imaging element.

In some embodiments, the analyzing element may include an image processing unit, a computer, a programmed electronic processor, or a microcontroller.

In some embodiments, the device may further include an alert unit configured to issue an alert based on a signal from the analyzing element.

In some embodiments, when the device is used for detection of low frequency vibration and displacement, the movable element may be in a form of a pipe, wherein said movable element may be connected by a hose or a swivel joint to a stationary housing harboring the transceiver unit, said stationary housing may be in a shape of a pipe, whereby low frequency vibrations or/and displacement of said movable element causes tilt change of said retro-reflective element relative to said radiation beam such that said tilt is being proportional to the vibration amplitude or/and displacement to be measured.

In some embodiments, when the device is used for detection of low frequency vibration and vertical displacement, the movable element may be in a form of a heavy mass that includes a retro-reflective element movably connected to a stationary housing, harboring the transceiver unit, said stationary housing is in a shape of a vertical mounted pipe, whereby low frequency vibrations or/and vertical displacement of said heavy mass causes tilt change of said retro-reflective element relative to said radiation beam such that said tilt is being proportional to the vibration amplitude or/and vertical displacement to be measured In some embodiments, when the device is used for detection of high frequency vibration, the retro-reflective element, may have a form of a retro-reflective sheeting, extended transversely to said radiation beam, may be attached to a spring cantilever or/and membrane, whereby each vibration of said cantilever or/and membrane causes the retro-reflective sheeting parts to change their tilts to modulate the radiation, said modulation being detected, and being related to the vibration or/and displacement to be measured.

In some embodiments, wherein the radiation source is mounted on a spring cantilever, whereby each vibration of said cantilever causes said radiation beam to move transversely relative to said retro-reflective sheeting in such manner that tilt of said radiation beam relative to said retro-reflective sheeting is being proportional to the vibration or/and displacement to be measured.

According to some embodiments, the transparent diffraction grating may have a reflective non transparent structure that reflect said diffraction and interference patterns to a second radiation receiver, which can detect high frequency vibrations.

In some embodiments, optical conjugation of said at least one radiation receiver plane with said diffraction grating plane may be carried out, executed or performed by an image system.

In some embodiments, the device may be used in high resolution three-axis detection and/or measurement of sources of displacement or/and mechanical vibrations.

According to some embodiments, the device may be used or when used in detection of earth movement, perimeter security and/or tunneling detection wherein:
  said housings are in the form of a pipe;
  the movable elements are in the form of a pipe, a pendulum based spring cantilever or/and a membrane;
  the at least one radiation source is a laser diode;
  the at least one radiation receiver is an image camera; and
  the at least one retro-reflective element is in the form of retro-reflective sheeting.

According to some embodiments, the device may be used for detection of movement of a subject body, wherein:
  the housings are in the form of a pipe configured to be attached to a base of a platform;
  the movable elements are in the form of a pendulum based spring, cantilever or/and a membrane;
  the at least one radiation source is a laser diode;
  the at least one radiation receiver is an image sensor; and
  the at least one retro-reflective element is in the form of retro-reflective sheeting.

According to some embodiments, the platform may be a bed or a crib. In some embodiments, the subject is an infant.

In some embodiments, an alert unit may be configured to issue an alert when no movement is detected over a predetermined period of time.

According to some embodiments, there is provided method for measurement of displacements and/or mechanical vibrations of a movable element caused by an external force, the method comprising the steps of:
  irradiating of at least one retro-reflective element by a radiation beam via a beam-splitting element;
  splitting said radiation beam by said beam-splitting element to multiple diffraction orders and using for the measurement at least two coherent partial beams;

reflecting back said at least two coherent partial beams by the at least one retro-reflective element to a radiation receiver located at a plane optically conjugated with a beam-splitting plane and being in a far field of said movable element, wherein said partial beams form an interference patterns;

detecting of a sequence of said retro-reflective interference patterns in the far field by said radiation receiver; said interference patterns are modified (displaced or changed their intensity distribution) by mechanical vibration or/and displacement of said movable element caused by the external force;

converting said sequence of the interference patterns into a digital signal indicative of the movement of said movable element in response to said external force; and determining, by an analyzing unit, amplitudes and frequencies of the detected vibrations and/or displacement values by processing of said interference patterns sequence.

According to some embodiments, the radiation beam may be selected from a low coherence radiation beam, high coherence radiation beam, a laser diode, a solid-state laser, a liquid laser, a gas laser, LED, a spectrometer and a monochromatic light source. Each possibility is a separate embodiment.

In some embodiments, the radiation beam splitting element may be selected from a diffraction grating, cube beam-splitter, mirror beam-splitter, wedged beam-splitter, and Wollaston polarizer or any combination thereof. Each possibility is a separate embodiment.

In some embodiments, retro-reflective element used in the method includes sheeting with an array of corner-cube micro-prisms or an array of cat-eye micro-reflectors.

In some embodiments, the optical conjugation of the main radiation receiver plane with the beam-splitting plane utilized in the method, may be carried out by an image system.

In some embodiments, the method may further include issuing an alert based on a signal from the analyzing unit.

In some embodiments, in the method, the external force may be applied along the retro-reflective sheeting to modify its shape; longitudinal displacement of a portion (part) of said retro-reflective sheeting may cause its magnified transversal displacement and respective tilts of particular parts of said retro-reflective sheeting; the tilts of the particular parts of the reflective sheeting may cause the interference pattern displacement or changing its intensity distribution in the plane of said radiation receiver.

According to some embodiments, there is provided a method for measurement of mechanical vibrations or/and displacements of a movable element caused by an external force, comprising the steps of:

irradiating an array of diffractive retro-reflectors, associated with a movable element, with a radiation beam that is reflected back to a radiation detector; wherein the array forms a changeable diffraction beam pattern in a far field, which is modified by mechanical vibration or/and displacement of the movable element in response to the external force;

detecting said changeable diffraction pattern by said radiation detector; and analyzing the changes by an analyzing unit, to determine amplitude and frequency of the movable element vibration or/and displacement.

According to some embodiments, the relation between intensities of back reflected and diffracted radiation from the retro-reflective array may be used for distance measurement between said movable element and radiation detector.

According to some embodiments, there is provided a device for detection and measurement of displacement or/and mechanical vibrations of a surface at a remote location, the system comprising:

a transceiver unit comprising:
  a) at least two monochromatic radiation sources capable of emitting radiation beams having different wavelengths;
  b) a beam-splitting element, capable of splitting said radiation beams to at least two coherent partial beams of each wavelength;
  c) a radiation receiver located in a plane optically coupled with a beam-splitting plane;

a movable unit at a remote location movably mounted with respect to said transceiver unit, said movable unit comprising:
  a) one or more movable elements that are susceptible to displacement and/or vibration by an external force applied on or at a surface;
  b) a retro-reflective element attached to at least one of said movable elements surface, wherein said retro-reflective element is capable of reflecting back the at least two coherent partial beams of each wavelength generated by the beam-splitting element, to form a sequence of interference patterns in a far field, wherein said patterns are modified by the displacement or/and mechanical vibration of said movable element; and an analyzing element operationally associated with said radiation receiver for analyzing at least one of: a displacement change, an intensity change and/or a frequency change in said sequence of interference patterns.

According to some embodiments, there is provided a system for detection and measurement of displacement or/and mechanical vibrations of a surface at a remote location, the system comprising:

a transceiver unit comprising:
  at least two monochromatic radiation sources capable of emitting radiation beams having different wavelengths;
  a beam-splitting element, capable of splitting said radiation beams to at least two coherent partial beams of each wavelength;
  a radiation receiver located in a plane optically coupled with a beam-splitting plane;

a movable unit at a remote location movably mounted with respect to said transceiver unit, said movable unit comprising:
  one or more movable elements that are susceptible to displacement and/or vibration by an external force applied on or at a surface;
  a retro-reflective element attached to at least one of said movable elements surface, wherein said retro-reflective element is capable of reflecting back the at least two coherent partial beams of each wavelength generated by the beam-splitting element, to form a sequence of interference patterns in a far field, wherein said patterns are modified by the displacement or/and mechanical vibration of said movable element;

an analyzing element operationally associated with said radiation receiver for analyzing at least one of: a displacement change, an intensity change and/or a frequency change in said sequence of interference patterns; and a transmitter unit configured to transmit data obtained from the analyzing element to a remote location.

According to some embodiments, there is provided a system for detection and/or measurement of displacement and/or rotation and/or mechanical vibrations of a surface at a remote location, the system comprising:
- a transceiver unit comprising:
  - at least one radiation source capable of emitting a radiation beam;
  - at least one radiation receiver;
- a movable unit movably mounted with respect to said transceiver unit, said movable unit comprising:
  - one or more movable elements that are susceptible to displacement and/or vibration by an external force;
  - at least one retro-reflective element attached to at least one of said movable elements, wherein said retro-reflective element is capable of reflecting back the radiation beam to form a sequence of radiation patterns in a far field, wherein said radiation patterns are modified by the displacement or/and mechanical vibration of said movable element;
- an analyzing element operationally associated with said radiation receiver for analyzing at least one of: a displacement change, an intensity change and/or a frequency change in said sequence of radiation patterns; and
- a transmitter unit configured to transmit data obtained from the analyzing element to the remote location.

According to some embodiments, the system may be used for high resolution three-axis detection and/or measurement of sources of displacement or/and mechanical vibrations.

According to some embodiments, the system may be used for detection of earth movement, perimeter security and/or tunneling detection.

According to some embodiments, the system may be used for detection of movement of a subject body.

The terms "comprises", "comprising", "includes", "including", "having" and their conjugates mean "including but not limited to". The terms "comprises" and "comprising" are limited in some embodiments to "consists" and "consisting", respectively. The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein the term "about" in reference to a numerical value stated herein is to be understood as the stated value+/−10%.

As used herein, the singular form "a", "an" and "the" include plural references unless the context clearly dictates otherwise. For example, the term "a compound" or "at least one compound" may include a plurality of compounds, including mixtures thereof.

The following examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

EXAMPLES

Example 1—Measurement of Displacement Using a Microscope

The following test of the retro-reflective laser seismometer was carried out using a microscope. The device was in the form of a pipe, as detailed above in the FIG. 4.

Measurement of Displacement Resolution.

The retro-reflective laser seismometer in form of pipe with length of 1260 mm and 50 mm diameter was mounted horizontally A microscope tube was attached to the cantilever 46 (see FIG. 4) of the seismometer and displaced in horizontal direction with accuracy of 2 μm.

The interference fringes displacement was recorded by the Basler acA3800-14um USB 3.0 camera with the ON Semiconductor MT9J003 CMOS sensor that delivers 14 frames per second at 10 MP resolution (without additional optics)

During the 50 μm displacement of the microscope tube the interference fringes were displaced by 2500 pixels in the CMOS sensor plane Therefore, the displacement resolution was:

R=50 μm/2500 pixels=0.02 μm or 20 nm

Example 2—Measurement of Frequencies Using a Shake Table

The following test of the retro-reflective laser seismometer was carried out using the Quanser Shake Table II.

The seismometer was in the form of the pipes with general length of 1260 mm and 50 mm diameter, as detailed above in the FIG. 3.

Measurement of Vibration Frequencies

The movable pipe of 1100 mm length (movable unit) of the retro-reflective laser seismometer was mounted on the Quanser Shake Table II at φ=0.048 rad angle to the shake table horizontal surface. The table had horizontal movement along the seismometer pipe The transceiver unit (stationary portion in the form of a pipe) of the seismometer was fixed to an affixed stand next to the shake table.

Frequencies f of the sine vibrations were measured at 0.5 Hz, 1 Hz and 3 Hz of the shake table vibrations with amplitudes A=0.05 mm, 0.1 mm, 0.2 mm, 0.4 mm, 0.8 mm, 1.6 mm and 3.2 mm. The results at the 0.05 mm amplitude are shown in FIG. 9.

Figure 9:
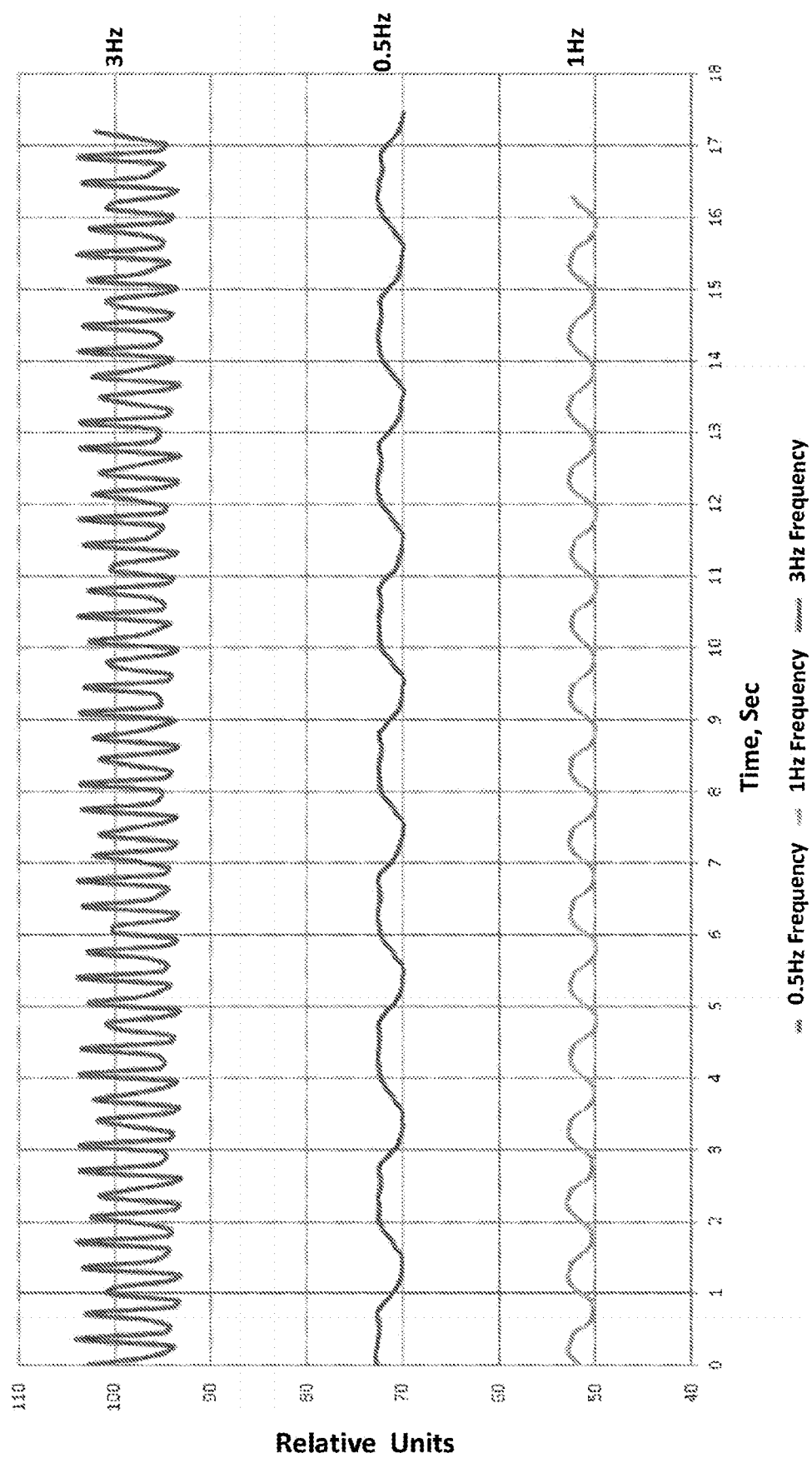
FIG. 9—a graph showing the results of experiments of measurement of frequencies of vibration at 0.5 Hz, 1 Hz and 3 Hz (at 0.05 mm amplitude), as measured by a retro-reflective laser interferometer device, in accordance with some embodiments.

Based on the data obtained and as can be seen in the graphs presented in FIG. 9, there is about 3% frequency matching between the shake table and measured frequencies of the sine vibrations.

Range of Vibration Velocities.

Minimal measured velocity:

at 0.5 Hz frequency the pipe amplitude was:

d=A*φ=0.05 mm*0.048=0.0024 mm the vibration velocity was:

V=2πf d=6.28*0.5 s$^{-1}$*0.0024 mm=0.0075 mms$^{-1}$

Maximal measured velocity:

at 3 Hz frequency the pipe amplitude was:

d=A*φ=3.2 mm*0.048=0.15 mm the vibration velocity was:

V=2πf d=6.28*3 s$^{-1}$*0.15 mm=2.9 mms$^{-1}$

Range of Accelerations:

Minimal measured acceleration:

a=(2πf)$^2$*d=40*(0.5)$^2$ s$^{-2}$*0.0024 mm=0.024 mms$^{-2}$

Maximal measured acceleration:

a=(2πf)$^2$*d=40*(3)$^2$ s$^{-2}$*0.15 mm=54 mms$^{-2}$

The results presented above with respect of the exemplary retro-reflective laser seismometer demonstrate that the device can indeed detect resolution of the displacement measurement of about 20 nm and about 3% frequency matching between the shake table and measured frequencies of the sine vibrations.

What we claim is:

1. A retro-reflective interferometer device for detection and/or measurement of displacements and/or rotations and/or mechanical vibrations, the device comprising:
   a transceiver unit comprising:
      a) at least one radiation source capable of emitting a radiation beam;
      b) at least one radiation receiver;
   a movable unit movably mounted with respect to said transceiver unit, said movable unit comprising:
      a) one or more movable elements that are susceptible to displacement and/or vibration by an external force;
      b) at least one retro-reflective element attached to at least one of said movable elements, wherein said retro-reflective element is capable of reflecting back the radiation beam to form a sequence of radiation patterns in a far field, wherein said radiation patterns are modified by the displacement or/and mechanical vibration of said movable element; and
   an analyzing element operationally associated with said radiation receiver for analyzing at least one of: a displacement change, an intensity change and/or a frequency change in said sequence of radiation patterns.

2. The device according to claim 1, further comprising a beam-splitting element, capable of splitting said radiation beam to at least two coherent partial beams; wherein the at least one radiation receiver is located in a plane optically coupled with a beam-splitting plane, and/or wherein the device further comprises a diffraction grating element, capable of splitting said radiation beam to at least two coherent partial beams.

3. The device according to claim 1, wherein at least one radiation receiver is configured to detect said sequence of the radiation patterns generated by said at least one retro-reflective element, to convert the detected radiation into an electric signal; said radiation receiver is capable of generating an output signal in response to said radiation pattern changes resulting from said displacement or/and mechanical vibration of said movable element, the output signal comprises information regarding amplitude and/or frequency of said displacement or/and mechanical vibration.

4. The device according to claim 1, wherein the retro-reflective element is in the form of retro-reflective sheeting, said retro-reflective sheeting comprises an array of corner-cube micro-prisms, an array of cat-eye micro-reflectors, a fiber-optic back reflection bundle, MEMS mirrors or combinations thereof.

5. The device according to claim 4, wherein said retro-reflective element is capable of reflecting back said radiation beam and to form a diffraction pattern in the far field, said diffraction patterns are modified by the mechanical vibration or/and displacement driven by the external force.

6. The device according to claim 1, wherein the transceiver unit, the movable unit and/or the analyzing element are situated in a single or discrete housings, said discrete housings are functionally and/or physically associated.

7. The device according to claim 6, wherein the housings comprise a shape selected from: a pipe, a Quadrilateral or tubular shape and/or wherein the movable elements comprises a pipe, a pendulum, a spring, a pendulum based spring cantilever, a membrane, a float, or any combination thereof.

8. The device according to claim 6 for use in detection of earth movement, perimeter security and/or tunneling wherein:
   said housings are in the form of a pipe;
   said movable elements are in the form of a pipe, a pendulum-based spring cantilever or/and a membrane;
   said at least one radiation source is a laser diode;
   said at least one radiation receiver is an image camera;
   said at least one retro-reflective element is in the form of retro-reflective sheeting; or
   for use in detection of movement of a subject body, wherein:
   said housings are in the form of a pipe configured to be attached to a base of a platform;
   said movable elements are in the form of a pendulum-based spring, cantilever or/and a membrane;
   said at least one radiation source is a laser diode;
   said at least one radiation receiver is an image sensor; and
   said at least one retro-reflective element is in the form of retro-reflective sheeting.

9. The device according to claim 1, wherein the radiation source is selected from a low coherence radiation beam, high coherence radiation beam, a laser diode, a solid-state laser, a liquid laser, a gas laser, LEDs, and a monochromatic light source.

10. The device according to claim 1, wherein said at least one radiation receiver is selected from: a CCD or CMOS image sensor, a video camera, a photodiode array, a position-sensitive light detector (PSD) and a single photodiode.

11. The device according to claim 1, wherein the analyzing element comprises an image processing unit, a computer, a programmed electronic processor, or a microcontroller.

12. The device according to claim 1, wherein for detection of low frequency vibration and displacement, said movable element is in a form of a pipe, wherein said movable element is connected by a hose or a swivel joint to a stationary housing harboring the transceiver unit, said stationary housing is in a shape of a pipe, whereby low frequency vibrations or/and displacement of said movable element causes tilt change of said retro-reflective element relative to said radiation beam such that said tilt is being proportional to the vibration amplitude or/and displacement to be measured; or wherein for detection of low frequency vibration and vertical displacement, said movable element is in a form of a heavy mass that comprises the retro-reflective element movably connected to a stationary housing, harboring the transceiver unit, said stationary housing is in a shape of a vertical mounted pipe, whereby low frequency vibrations or/and vertical displacement of said heavy mass causes tilt change of said retro-reflective element relative to said radiation beam such that said tilt is being proportional to the vibration amplitude or/and vertical displacement to be measured.

13. The device according to claim 1, wherein for detection of high frequency vibration, the retro-reflective element, having a form of a retro-reflective sheeting, extended transversely to said radiation beam, is attached to a spring cantilever or/and membrane, whereby each vibration of said cantilever or/and membrane causes the retro-reflective sheeting parts to change their tilts to modulate the radiation, said modulation being detected, and being related to the vibration or/and displacement to be measured.

14. The device according to claim 1 for use in high resolution three-axis detection and/or measurement of sources of displacement or/and mechanical vibrations, wherein the transceiver unit comprises three radiation light sources having different wavelengths and corresponding radiation detectors.

15. A method for measurement of displacements and/or mechanical vibrations of a movable element caused by an external force, the method comprising the steps of:

irradiating at least one retro-reflective element by one or more radiation beams;

reflecting back said one or more radiation beams by the at least one retro-reflective element to a radiation receiver located at a plane optically conjugated with a plane of the radiation beam, being in a far field of said movable element, wherein a radiation pattern is formed by said radiation beam as result of reflection from the at least one retro-reflective element;

detecting a sequence of said retro-reflective radiation patterns in the far field by said radiation receiver; said radiation patterns are modified in displacement or intensity distribution thereof, by mechanical vibration or/and displacement of said movable element caused by the external force;

converting said sequence of the radiation patterns into a digital signal indicative of the movement of said movable element in response to said external force; and determining, by an analyzing unit, amplitudes and frequencies of the detected vibrations and/or displacement values by processing of said radiation patterns sequence.

16. The method according to claim 15, further comprising splitting said radiation beam by a beam-splitting element to multiple diffraction orders and using for the measurement at least two coherent partial beams; wherein the radiation receiver is located at a plane optically conjugated with a beam splitting plane.

17. A system for detection and measurement of displacement or/and mechanical vibrations of a surface at a remote location, the system comprising:
a transceiver unit comprising:
  a) at least two monochromatic radiation sources capable of emitting radiation beams having different wavelengths;
  b) a beam-splitting element, capable of splitting said radiation beams to at least two coherent partial beams of each wavelength;
  c) a radiation receiver located in a plane optically coupled with a beam-splitting plane;
a movable unit at a remote location movably mounted with respect to said transceiver unit, said movable unit comprising:
  a) one or more movable elements that are susceptible to displacement and/or vibration by an external force applied on or at the remote surface;
  b) a retro-reflective element attached to at least one of said movable elements, wherein said retro-reflective element is capable of reflecting back the at least two coherent partial beams of each wavelength generated by the beam-splitting element, to form a sequence of interference patterns in a far field, wherein said patterns are modified by the displacement or/and mechanical vibration of said movable element;
an analyzing element operationally associated with said radiation receiver for analyzing at least one of: a displacement change, an intensity change and/or a frequency change in said sequence of interference patterns; and
a transmitter unit configured to transmit data obtained from the analyzing element to a remote location.

18. The system according to claim 17 for use in high resolution three-axis detection and/or measurement of sources of displacement or/and mechanical vibrations, wherein the transceiver unit comprises three light sources having different wavelengths and corresponding radiation receivers.

19. The system according to claim 17 for use in detection of earth movement, perimeter security, or tunneling detection.

* * * * *